US 9,003,436 B2

(12) United States Patent
Tidwell et al.

(10) Patent No.: US 9,003,436 B2
(45) Date of Patent: *Apr. 7, 2015

(54) APPARATUS AND METHODS FOR DATA COLLECTION, ANALYSIS AND VALIDATION INCLUDING ERROR CORRECTION IN A CONTENT DELIVERY NETWORK

(71) Applicant: Time Warner Cable Enterprises LLC, New York, NY (US)

(72) Inventors: Justin Tidwell, Waxhaw, NC (US); Eduardo Samame, Rowayton, CT (US); Craig Engel, Shamong, NJ (US)

(73) Assignee: Time Warner Cable Enterprises LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/936,055

(22) Filed: Jul. 5, 2013

(65) Prior Publication Data
US 2013/0298149 A1 Nov. 7, 2013

Related U.S. Application Data

(63) Continuation of application No. 12/829,104, filed on Jul. 1, 2010, now Pat. No. 8,484,511.

(51) Int. Cl.
*H04N 7/16* (2011.01)
*G06F 11/00* (2006.01)
(Continued)

(52) U.S. Cl.
CPC ....... *H04N 21/2408* (2013.01); *H04N 21/4667* (2013.01); *H04N 21/6582* (2013.01);
(Continued)

(58) Field of Classification Search
CPC .......... H04N 21/4667; H04N 21/4668; H04N 21/6582; H04N 21/44204; H04N 21/44222; H04N 21/4524; H04N 21/4532; H04N 21/458; H04N 21/2408; H04H 60/64; H04H 60/33; H04H 60/46; G06F 11/008
USPC ....... 725/9, 13, 14; 714/1; 709/224; 707/700; 705/14.49
See application file for complete search history.

(56) References Cited

U.S. PATENT DOCUMENTS 6,389,538 B1  5/2002  Gruse et al.
7,174,126 B2  2/2007  McElhatten et al.
(Continued)

OTHER PUBLICATIONS

UTF-32. IBM, retrieved from http://publib.boulder.ibm.com/infocenter.iseries/v5r3/index.jsp?topic=%2Fnls%2Frbagsutf32.htm on Aug. 28, 2013.

*Primary Examiner* — Hoang-Vu A Nguyen-Ba
(74) *Attorney, Agent, or Firm* — Gazdzinski & Associates, PC

(57) ABSTRACT

Methods and apparatus for collection, validation, analysis, and automated error correction of data regarding user interaction with content. In one embodiment, statistical methods are used to arrive at expected values for the collected data. The data is compared to the expected value and must meet one or more acceptance criteria (e.g., be within a prescribed range) to be considered valid. The prescribed range is determined by the network operator, or a computer program adapted to generate this value. The invention enables a network operator to assess a large volume of data without requiring significant amounts of manual monitoring and/or error correction. The ability to collect, validate and analyze data across multiple platforms is also provided. Still further, an automated system capable of learning evaluation and error correction patterns is disclosed.

25 Claims, 16 Drawing Sheets

(51) Int. Cl.
*H04N 21/24* (2011.01)
*H04N 21/466* (2011.01)
*H04N 21/658* (2011.01)
*H04N 21/442* (2011.01)
*H04N 21/458* (2011.01)
*H04H 60/64* (2008.01)
*G06F 15/173* (2006.01)
*G06F 7/50* (2006.01)
*G06Q 30/00* (2012.01)
*H04N 21/45* (2011.01)
*H04H 60/33* (2008.01)
*H04H 60/46* (2008.01)

(52) U.S. Cl.
CPC ... *H04N21/44204* (2013.01); *H04N 21/44222* (2013.01); *H04N 21/4524* (2013.01); *H04N 21/4532* (2013.01); *H04N 21/458* (2013.01); *G06F 11/008* (2013.01); *H04H 60/33* (2013.01); *H04H 60/46* (2013.01); *H04H 60/64* (2013.01)

(56) References Cited

U.S. PATENT DOCUMENTS

| | | | |
|---|---|---|---|
| 7,213,036 | B2 | 5/2007 | Apparao et |
| 7,242,988 | B1 * | 7/2007 | Hoffberg et al. ............ 700/28 |
| 7,363,643 | B2 | 4/2008 | Drake et al. |
| 7,444,655 | B2 | 10/2008 | Sardera |
| 7,457,520 | B2 | 11/2008 | Rossetti et al. |
| 7,567,983 | B2 | 7/2009 | Pickelsimer |
| 7,602,820 | B2 | 10/2009 | Helms et al. |
| 7,650,319 | B2 * | 1/2010 | Hoffberg et al. ............ 706/45 |
| 7,900,052 | B2 | 3/2011 | Jonas |
| 7,954,131 | B2 | 5/2011 | Cholas et al. |
| 8,347,341 | B2 | 1/2013 | Markley et al. |
| 8,484,511 | B2 | 7/2013 | Tidwell et al. |
| 2003/0056217 | A1 | 3/2003 | Brooks |
| 2003/0220100 | A1 | 11/2003 | McElhatten et al. |
| 2004/0230994 | A1 | 11/2004 | Urdang et al. |
| 2005/0034171 | A1 | 2/2005 | Benya |
| 2005/0086334 | A1 | 4/2005 | Aaltonen et al. |
| 2007/0022459 | A1 | 1/2007 | Gaebel, Jr. et al. |
| 2007/0061023 | A1 * | 3/2007 | Hoffberg et al. ............ 700/83 |
| 2007/0157262 | A1 | 7/2007 | Ramaswamy et al. |
| 2007/0180230 | A1 | 8/2007 | Cortez |
| 2007/0217436 | A1 | 9/2007 | Markley et al. |
| 2007/0280298 | A1 | 12/2007 | Hearn et al. |
| 2008/0170551 | A1 | 7/2008 | Zaks |
| 2008/0306903 | A1 | 12/2008 | Larson et al. |
| 2009/0086643 | A1 | 4/2009 | Kotrla et al. |
| 2009/0133048 | A1 | 5/2009 | Gibbs |
| 2009/0150917 | A1 | 6/2009 | Huffman et al. |
| 2010/0005527 | A1 | 1/2010 | Jeon |
| 2010/0027560 | A1 | 2/2010 | Yang et al. |
| 2010/0115091 | A1 | 5/2010 | Park et al. |
| 2010/0122276 | A1 | 5/2010 | Chen |
| 2010/0125658 | A1 | 5/2010 | Strasters |
| 2010/0218231 | A1 | 8/2010 | Frink et al. |
| 2010/0251305 | A1 | 9/2010 | Kimble et al. |
| 2010/0280641 | A1 * | 11/2010 | Harkness et al. ............ 700/94 |
| 2010/0313225 | A1 | 12/2010 | Cholas et al. |
| 2011/0015989 | A1 | 1/2011 | Tidwell et al. |
| 2011/0016479 | A1 | 1/2011 | Tidwell et al. |
| 2011/0016482 | A1 | 1/2011 | Tidwell et al. |
| 2011/0090898 | A1 | 4/2011 | Patel et al. |
| 2011/0093900 | A1 | 4/2011 | Patel et al. |
| 2011/0099017 | A1 | 4/2011 | Ure |
| 2011/0103374 | A1 | 5/2011 | Lajoie et al. |
| 2011/0110515 | A1 | 5/2011 | Tidwell et al. |
| 2011/0178943 | A1 | 7/2011 | Motahari et al. |
| 2011/0265116 | A1 | 10/2011 | Stern et al. |
| 2012/0030363 | A1 | 2/2012 | Conrad |
| 2012/0124606 | A1 | 5/2012 | Tidwell et al. |

* cited by examiner

APPARATUS AND METHODS FOR DATA COLLECTION, ANALYSIS AND VALIDATION INCLUDING ERROR CORRECTION IN A CONTENT DELIVERY NETWORK

RELATED APPLICATIONS

Priority and Related Applications

This application is a continuation of and claims priority to U.S. patent application Ser. No. 12/829,104 filed Jul. 1, 2010 entitled APPARATUS AND METHODS FOR DATA COLLECTION, ANALYSIS AND VALIDATION INCLUDING ERROR CORRECTION IN A CONTENT DELIVERY NETWORK, issuing as U.S. Pat. No. 8,484,511 on Jul. 9, 2013, each of which is incorporated herein by reference in its entirety. This application is related to co-owned, co-pending U.S. patent application Ser. No. 12/503,749 filed on Jul. 15, 2009 and entitled "METHODS AND APPARATUS FOR EVALUATING AN AUDIENCE IN A CONTENT-BASED NETWORK", co-owned, U.S. patent application Ser. No. 12/503,710 filed Jul. 15, 2009 and entitled "METHODS AND APPARATUS FOR TARGETED SECONDARY CONTENT INSERTION", co-owned, co-pending U.S. patent application Ser. No. 12/503,772 filed Jul. 15, 2009 and entitled "METHODS AND APPARATUS FOR CLASSIFYING AN AUDIENCE IN A CONTENT-BASED NETWORK", and co-owned, U.S. Provisional Patent Application Ser. No. 61/260,346 filed on Nov. 11, 2009 and entitled "METHODS AND APPARATUS FOR AUDIENCE DATA COLLECTION AND ANALYSIS IN A CONTENT DELIVERY NETWORK", co-owned, co-pending U.S. patent application Ser. No. 12/582,619 filed Oct. 20, 2009 and entitled "GATEWAY APPARATUS AND METHODS FOR DIGITAL CONTENT DELIVERY IN A NETWORK", co-owned, co-pending U.S. patent application Ser. No. 12/414,576 filed on Mar. 30, 2009 and entitled "RECOMMENDATION ENGINE APPARATUS AND METHODS", and co-owned, co-pending U.S. patent application Ser. No. 11/378,129 filed Mar. 16, 2006 and entitled "METHODS AND APPARATUS FOR CENTRALIZED CONTENT AND DATA DELIVERY", each of which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of content and/or data collection and use over one or more networks. More particularly, the present invention is related in one exemplary aspect to apparatus and methods for collecting data related to content usage, and validating the collected data.

2. Description of Related Technology

"Nielsen® Ratings" are a well known system of evaluating the viewing habits of cross sections of the population. When collecting Nielsen® audience data, companies use statistical techniques to develop a sample population which is a cross section of a larger national population. Theoretically, the viewing habits of the sample population will mirror the larger population. The companies then measure the populations viewing habits to identify, among other things, what programs the population is watching as well as the time and frequency at which those programs are watched. This information is then extrapolated to gain insight on the viewing habits of the larger population. Historically, the Nielsen® audience measurement system has been the primary source of audience measurement information in the television industry. The Nielsen® audience measurement system, therefore, affects various aspects of television including inter alia, advertising rates, schedules, viability of particular shows, etc., and has been also recently expanded from measuring an audience of program content to measuring an audience of advertising (i.e., Nielsen® audience ratings may be provided for advertisements themselves).

The Nielsen® audience measurement system collects data regarding audiences via either (i) by asking viewers of various demographics to keep a written record of the television shows they watch throughout the day and evening, or (ii) by using "set meters," which are small devices connected to televisions in selected homes which electronically gather the viewing habits of the home and transmit the information nightly to the Nielsen® audience measurement system or a proxy entity over a connected phone line or other connection.

There are several disadvantages to the approached used by the Nielsen® audience measurement system. First, the sample of viewers selected may not be fairly representative of the population of viewers (or the subset of cable viewers) as a whole. For example, in a content distribution (e.g., cable or HFCu or satellite) network comprising four million cable viewers, a sample of any 100,000 viewers may exhibit different average viewing habits than the averages associated with the other 3,900,000 viewers who are not in the sample.

Second, static delivery makes it difficult to precisely target an audience that is known to be in the market. For example, suppose that the ideal target for a sports car advertisement is the set of all consumers who like and would be interested in buying sports cars. If all that is known from Nielsen® audience measurement data is that 10% of the sample group has watched the auto racing channel for over three hours in the last month, this may not perfectly correlate with set of consumers who like sports cars. This may be the case, for example, if there are some consumers who are in the market for sports cars but who never watch the auto racing channel, or if there are some viewers of the auto racing channel who have no interest in buying or owning sports cars. As such, patterns based on viewership data often imprecisely identify the desired audience.

Furthermore, the Nielsen® audience measurement system is disadvantageously program-specific. Program-specific audience data collection is problematic from the standpoint that this program-coupled approach is only as good as the underlying demographic correlation model. For example, assuming a demographic of 18-30 year old females typically tune in to American Idol each broadcast (e.g., Monday at 8:00 pm), this same demographic may not have any interest in watching the program immediately preceding or following American Idol, and hence may tune away (or delay tuning to that channel until the start of America Idol).

Another disability of the Nielsen® audience measurement system approach is that it tends to aggregate data or results for given premises (e.g., households) as opposed to providing data for specific users of that premises. For example, the switching activity associated with a given set top box for a family of five represents switching activity for each member of that family (including perhaps viewing of cartoons for a child, teen-related programs for a teenager, and adult-related content for one or more adults). Hence, the data obtained using Nielsen® audience measurement system techniques may be somewhat of an amalgam of the data for individual users, and various combinations thereof. Though certain so called "people meters" may be utilized for the precise identification of a viewer such as by age, sex, etc.

Moreover, although various user- or household-specific data collection mechanisms are known in the art, there is currently no way of guaranteeing a level of confidence in the integrity of the underlying data set, unless the collected data is validated manually by a network operator. However, the volume of data collected using these prior art approaches is simply too large for manual (e.g., human) validation. In other words, the size of the pool of data is too large for manual validation of every tuning event across all platforms. Other methods for collecting a smaller subset of data are also in use in the art; however this market-by-market approach does not collect data in real time and, because the sample size is so small, leaves most viewing unmeasured.

Therefore, there is a salient need for improved methods and apparatus which are capable of collecting and validating audience measurement or usage data without restricting the pool size or population. Such improved methods and apparatus would ideally be adapted to gather audience information in real-time or near-real time with associated viewership actions of actual viewers. Further, the data collection and validation methods and apparatus would advantageously be configured to collect and validate data relating to all types of content (including for example VOD consumption, interactive consumption, broadcast consumption, DVR usage, EPG interaction, telephone usage, internet usage, etc.).

These features would also be provided using substantially extant network infrastructure and components, and would be compatible with a number of different client device and delivery systems including both wired and wireless technologies.

SUMMARY OF THE INVENTION

The present invention addresses the foregoing needs by disclosing, inter alia, apparatus and methods for content management and account linking across entities of two or more networks.

In a first aspect of the invention, a method of providing data collection is disclosed. In one embodiment, the data is generated within a content delivery network, and the method comprises: collecting a plurality of data relating to interaction of a plurality of users with content or apparatus controlling the content; deriving an expected value for the plurality of data; based at least in part on the expected value, configuring a range of acceptable values for the plurality of data; comparing the plurality of data to the range of acceptable values. If the plurality of data is within the range, the method comprises transmitting the plurality of data to at least one entity for analyzing the plurality of data. If the plurality of data is not within the range, the method comprises generating at least one error message; implementing an error correction process to correct the plurality of data; and transmitting corrected data to at least one entity for analyzing.

In one variant, the act of deriving the expected value for the plurality of data comprises utilizing statistical regression analysis.

In another variant, the act of configuring a range of acceptable values for the plurality of data comprises utilizing sample data to determine instances of error given various operator-designated ranges.

In still another variant, the content delivery network comprises an operator-managed network, and the error correction process comprises manual correction of the plurality of data by the operator.

In a second embodiment, the network comprises a content delivery network comprising a plurality of users receiving a plurality of content from a plurality of platforms, and the method comprises: collecting data relating to an interaction of the plurality of users with the plurality of content received from the plurality of platforms; performing one or more integrity checks on the data by comparing values of individual ones of a plurality of data fields in the data to one or more acceptance criteria for each of the individual ones of the plurality of data fields; and where the one or more criteria are met, transmitting the data to at least one entity for analyzing the data.

In one variant, the plurality of platforms include at least one of: a video on demand (VOD) server, a linear broadcast content source, and an Internet content source.

In another variant, the method further comprises anonymizing the data via at least one cryptographic hash function.

In a further variant, the act of performing one or more integrity checks comprises: deriving expected values for each of the individual ones of the plurality of data fields; and based at least in part on the expected values, configuring a range of acceptable values for the of the individual ones of the plurality of data fields.

In a second aspect of the invention, a method of correcting errors is disclosed. In one embodiment, the errors occur in one or more fields of a plurality of collected data, and the method comprises: accessing an error indication, the error indication identifying the one or more fields of an individual one of the plurality of collected data having one or more errors; determining whether an error correction record exists for correction of the one or more fields. If the error correction record exists for correction of the one or more fields, the method comprises automatically correcting the one or more fields, and if the error correction record does not exist for correction of the one or more fields, performing a secondary error correction process.

In one variant, the correction process comprises generating the error correction record for the one or more fields; and storing the error correction record for the one or more fields for subsequent substantially automatic correction of errors in the one or more fields.

In another variant, the error indication comprises an error message, and the secondary process comprises manual correction by an operator.

In a third aspect of the invention, computer readable apparatus is disclosed. In one embodiment, the apparatus comprises a medium adapted to store a computer program thereon, the computer program configured to, when executed: collect data relating to interaction of a plurality of users with a plurality of content received from a plurality of platforms, the data each comprising a plurality of data fields having values contained therein capable of being validated; and compare the values of the plurality of data fields for each of the data to one or more acceptance criteria. If the one or more criteria of the plurality of data fields are met, the program transmits the plurality of data to at least one entity for analysis and if the one or more criteria of the plurality of data fields are not met, the program implements a substantially automated error correction process.

In a fourth aspect of the invention, improved consumer premises equipment having data acquisition, storage, and transmission capability is disclosed.

In a fifth aspect of the invention, improved consumer premises equipment having indigenous content interaction data processing capability is disclosed.

In a sixth aspect of the invention, a network architecture for collecting and processing data from user or other devices within the network is disclosed. In one embodiment, the architecture comprises one or more validation entities which check data integrity and delivery integrity.

In a seventh aspect of the invention, methods of doing business (and associated business models) using content interaction data are disclosed.

In an eighth aspect of the invention, an apparatus configured to provide data collection in a network is disclosed. In one embodiment, the apparatus comprises a data processing apparatus and computerized logic in data communication with the processing apparatus. The logic may be configured to collect a plurality of data relating to interaction of a plurality of users with content or with an apparatus controlling the content, derive an expected value for the plurality of data, based at least in part on the expected value, configure a range of acceptable values for the plurality of data, compare the plurality of data to the range of acceptable values, and based at least in part on the comparison, transmit the plurality of data to at least one entity for analysis of the plurality of data when the plurality of data is determined to be within the range, or when the plurality of data is determined not to be within the range: generate at least one error message, implement an error correction process to correct the plurality of data, and transmit corrected data to at least one entity for analyzing.

These and other aspects of the invention shall become apparent when considered in light of the disclosure provided herein.

Figure 1:
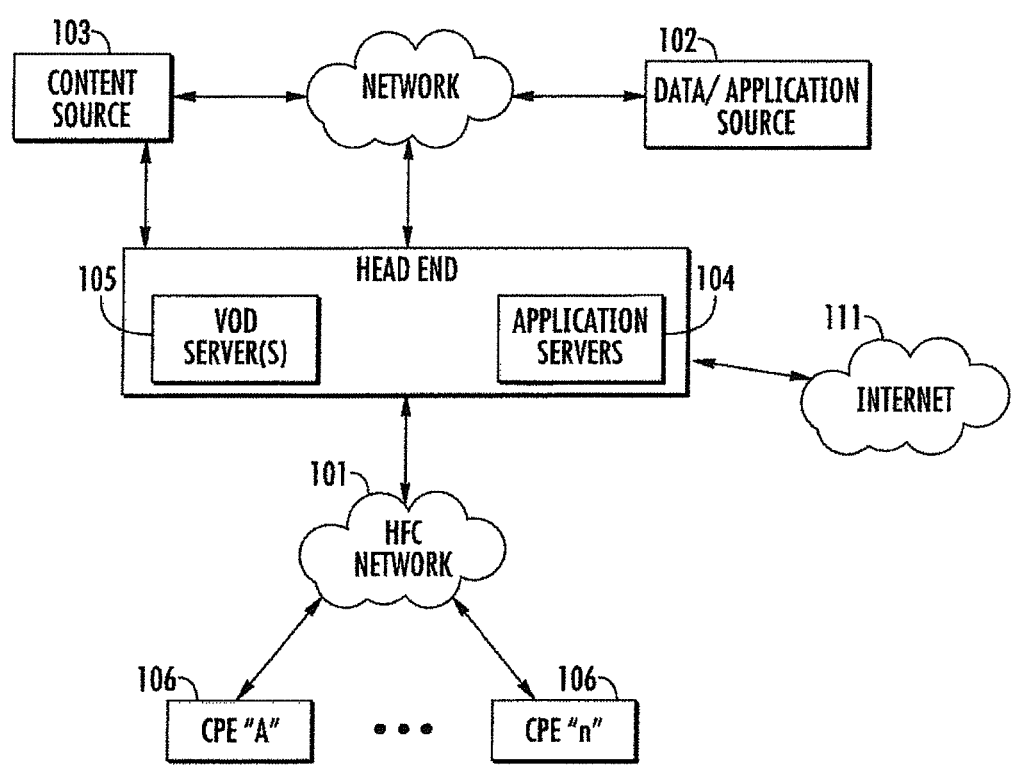
FIG. 1 is a functional block diagram illustrating an exemplary HFC cable network configuration useful with the present invention.

All Figures© Copyright 2010 Time Warner Cable, Inc. All rights reserved.

DETAILED DESCRIPTION OF THE INVENTION

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set top boxes (e.g., DSTBs), personal computers (PCs), and minicomputers, whether desktop, laptop, or otherwise, and mobile devices such as handheld computers, PDAs, personal media devices (PMDs), and smartphones.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

The terms "Customer Premises Equipment (CPE)" and "host device" refer to any type of electronic equipment located within a customer's or user's premises and connected to a network.

As used herein, the term "display" means any type of device adapted to display information, including without limitation CRTs, LCDs, TFTs, plasma displays, LEDs, incandescent and fluorescent devices, or combinations/integrations thereof. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network.

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet.

As used herein, the terms "Internet" and "internet" are used interchangeably to refer to inter-networks including, without limitation, the Internet.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11a, b, g, n), WiMAX (802.16), PAN (e.g., 802.15), or IrDA families.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage device" refers to without limitation computer hard drives, DVR device, memory, RAID devices or arrays, optical media (e.g., CD-ROMs, Laserdises, Blu-Ray, etc.), or any other devices or media capable of storing content or other information.

As used herein, the term "Wi-Fi" refers to, without limitation, any of the variants of IEEE-Std. 802.11 or related standards including 802.11a/b/g/n/v.

As used herein, the term "wireless" means any wireless signal, data, communication, or other interface including without limitation Wi-Fi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

The present invention discloses, inter alia, methods and apparatus for collection, validation, analysis, and automated error correction of data relating to user interaction with content.

Exemplary implementations of the invention obtain audience information directly from customer's premises equipment (i.e., set top boxes, cable modems, PCs, PMDs, IP devices, etc.), for each individual device, or even on a per-user basis where possible, thereby allowing a content provider or other analytical entity to gather specific information in large quantities across a broad geographical area, or demographic/psychographic slice. Advantageously, multiple sources of content to which viewership behavior relates can be simultaneously monitored, and subscriber anonymity or privacy maintained (i.e., no use is made of personally identifiable information).

The aforementioned systems and methods also may optionally be configured to "predict" tuning behavior for groups as well as individual users.

In one embodiment, statistical methods (e.g., linear regression, log linear regression) are used to arrive at an expected value for one or more of the various fields and records of the collected data. Collected data is compared to the derived (e.g., average) or expected value, and if the data meets one or more prescribed criteria (e.g., is a given number of standard deviations away from the expected value or more) indicating that the data quality may be unacceptable, an error message is generated and the data optionally excluded. The criteria used to judge the data (e.g., member of standard deviations which the data is permitted to vary from the expected value) may be determined by the network operator, or an algorithm/computer program. Hence, the present invention advantageously enables monitoring of an entire system proactively using a statistical or other method to alert the network operator only in the instance erroneous data meeting the test(s) of significance is received. The present invention improves over prior methods by, among other things, enabling a network operator to assess a large volume of data (in a comparatively contracted period of time) without requiring manual monitoring and/or error correction.

Another advantage of the invention includes the ability to collect, validate and analyze data across multiple platforms. That is, data regarding a users interaction with content may be collected and utilized regardless of the device on which the content is received or requested, the source of the content, the type of content (e.g., linear, VOD, DVR, high-speed data, etc.), etc. While the exemplary systems and methods operate utilizing two-way capable user devices such as those used in cable or fiber optic (FTTC, FTTH, etc.) networks, non-two way capable devices (such as for example are used in some satellite-based implementations) can leverage various backhauls (e.g., broadband, DSL/dial-up or "over the top" backhaul) from the target premises to transmit tuning or other useful information to a third party (e.g., third party website). The third party collects the data and sends the data back to the satellite MSO (or caches the data first, and sends it up to the MSO at a later time). Pre-processing or "enrichment" of the data may also be conducted by the third party if desired.

The apparatus and methods of the invention may be used to collect, validate and analyze a heretofore unprecedented volume of data. Evaluation criteria are set such that the network operator is not flooded with alerts of erroneous data. Instead, a multi-tier approach is utilized to allow for e.g., some processing, no processing, minimal processing, total evaluation, etc. This is accomplished by enabling the administrator to define the statistical parameters (e.g., of the regression); the administrator may "tune" these parameters over time based on experience in the field and other inputs. An automated system capable of learning evaluation and error correction patterns is also described, as are business models and rules for the implementation of the aforementioned methods and for the collection, validation and analysis of data relating to a user's interaction with content.

DETAILED DESCRIPTION OF EXEMPLARY EMBODIMENTS

Exemplary embodiments of the apparatus and methods of the present invention are now described in detail. While these exemplary embodiments are described in the context of use with the aforementioned hybrid fiber coax (HFC) cable system, or satellite network architecture having an multiple systems operator (MSO), digital networking capability, IP delivery capability, and plurality of client devices/CPE, the general principles and advantages of the invention may be extended to other types of networks and architectures, whether broadband, narrowband, wired or wireless, or otherwise, the following therefore being merely exemplary in nature. For instance, the invention may be adapted for use on so-called hybrid fiber copper (HFCu) networks, or WiMAX (IEEE Std. 802.16) wireless networks.

It will also be appreciated that while described generally in the context of a consumer (i.e., home) end user domain, the present invention may be readily adapted to other types of environments (e.g., commercial/enterprise, government/military, etc.) as well. Myriad other applications are possible.

Also, while certain aspects are described primarily in the context of the well-known Internet Protocol (described in, inter alia, RFC 791 and 2460) and Session Initiation Protocol (SIP), it will be appreciated that the present invention may utilize other types of protocols (and in fact bearer networks to include other internees and intranets) to implement the described functionality.

Other features and advantages of the present invention will immediately be recognized by persons of ordinary skill in the art with reference to the attached drawings and detailed description of exemplary embodiments as given below.

Network—

FIG. 1 illustrates a typical content delivery network configuration with which the apparatus and methods of the present invention may be used. The various components of the network 100 include (i) one or more data and application origination points 102; (ii) one or more content sources 103, (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC) network 101. The headend is also connected through a gateway or other such interface (not shown) to unmanaged external internetworks such as the Internet 111. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the architecture of FIGS. 1a-1c (described in greater detail below) may be used.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104.

Although not illustrated, a typical network headend 150 may further include e.g., various billing entities, subscriber management systems, cable modem termination system (CMTS)

It will also be appreciated that the network configuration depicted in FIG. 1 is high-level, conceptual architecture and that each MSO may have multiple headends deployed using custom architectures.

The exemplary headend 150 may further include a multiplexer-encrypter-modulator (MEM) adapted to process or condition content for transmission over the network. As previously described, information is carried across multiple channels. Thus, the headend 150 must be adapted to acquire the information for the carried channels from various sources. Typically, the channels being delivered from the headend 150 to the CPE 106 ("downstream") are multiplexed together in the headend, as previously described and sent to neighborhood hubs (FIG. 1b) via a variety of interposed network components.

It will also be recognized, however, that the multiplexing operation(s) need not necessarily occur at the headend 150 (e.g., in the aforementioned MEM). As one alternative, a multi-location or multi-stage approach can be used, such as that described in U.S. Pat. No. 7,602,820, entitled "APPARATUS AND METHODS FOR MULTI-STAGE MULTIPLEXING IN A NETWORK" incorporated herein by reference in its entirety, which discloses inter cilia improved multiplexing apparatus and methods that allow such systems to dynamically compensate for content (e.g., advertisements, promotions, or other programs) that is inserted at a downstream network node such as a local hub, as well as "feed-back" and "feed forward" mechanisms for transferring information between multiplexing stages.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0 (and subsequent) specification provides for exemplary networking protocols both downstream and upstream, although the invention is in no way limited to these approaches.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

Figure 1A:
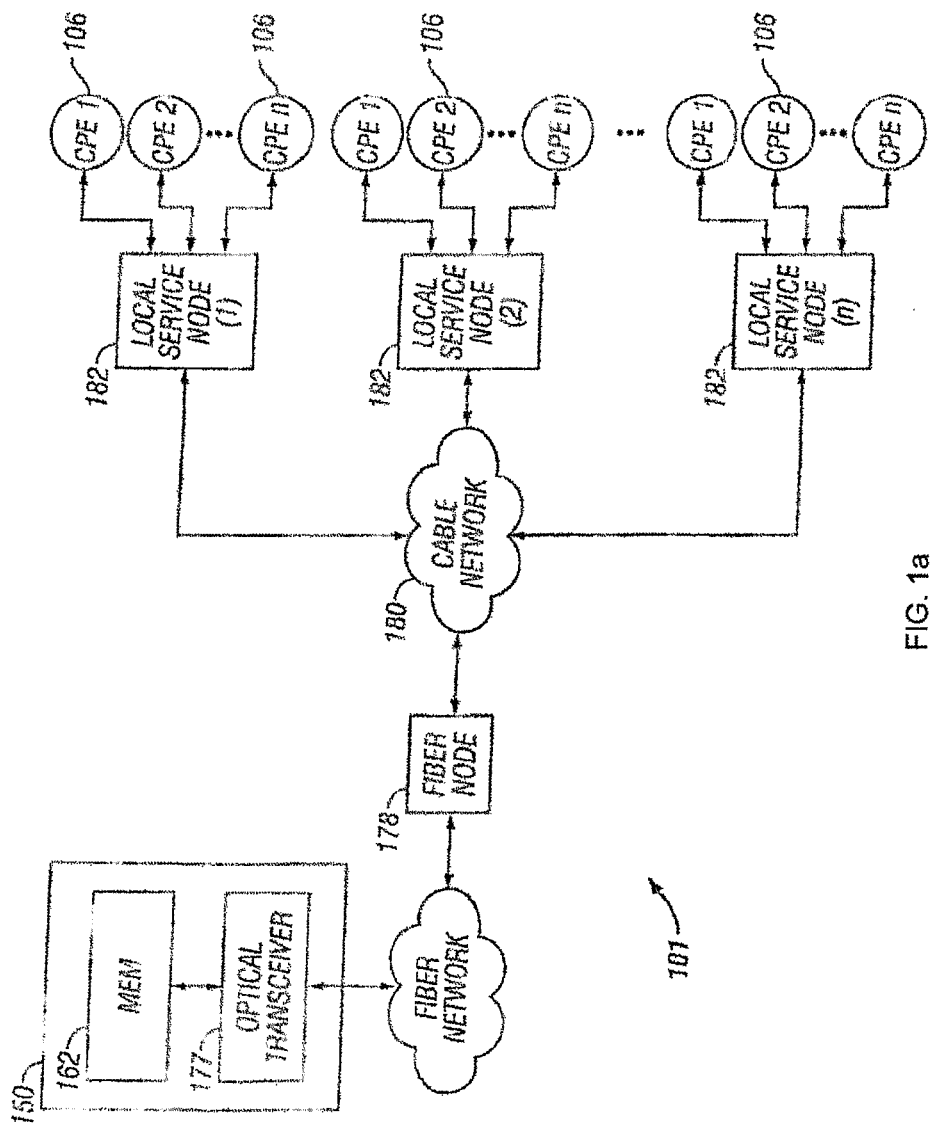
FIG. 1a is a functional block diagram illustrating one exemplary local service node configuration useful with the present invention.

In addition to on-demand and broadcast content (e.g., video programming), the system of FIGS. 1 and 1*a* (and 1*b* and 1*c* discussed below) also deliver Internet 111 data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels, such as via a multiplexed transport stream (MPTS). In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem. Delivery in such packetized modes may be unicast, multicast, or broadcast. Delivery of the LP-encapsulated data may also occur over the non-DOCSIS QAMs, such as described below with respect to FIG. 1*c*.

The CPE 106 are each configured to monitor the particular assigned RF channel (such as via a port or socket ID/address, or other such mechanism) for IP packets intended for the subscriber premises/address that they serve.

"Switched" Networks—

Figure 1B:
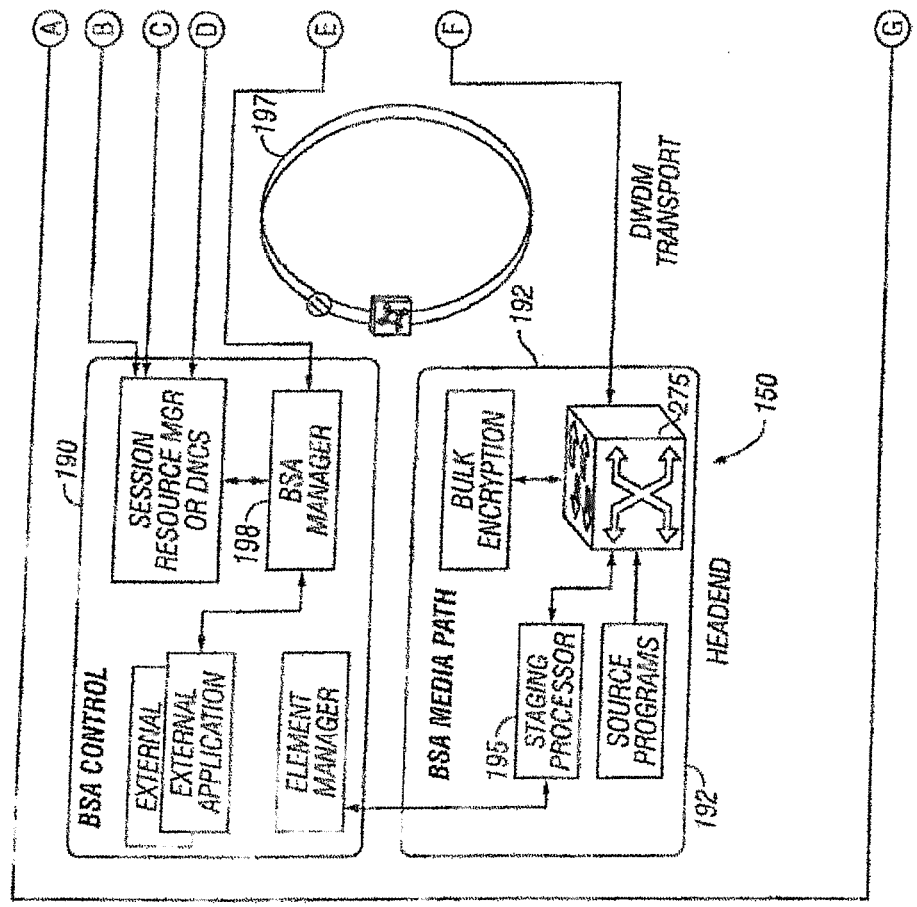
FIG. 1b and 1b Continued are a functional block diagrams illustrating one exemplary broadcast switched architecture (BSA) network useful with the present invention.
Figure 1B:
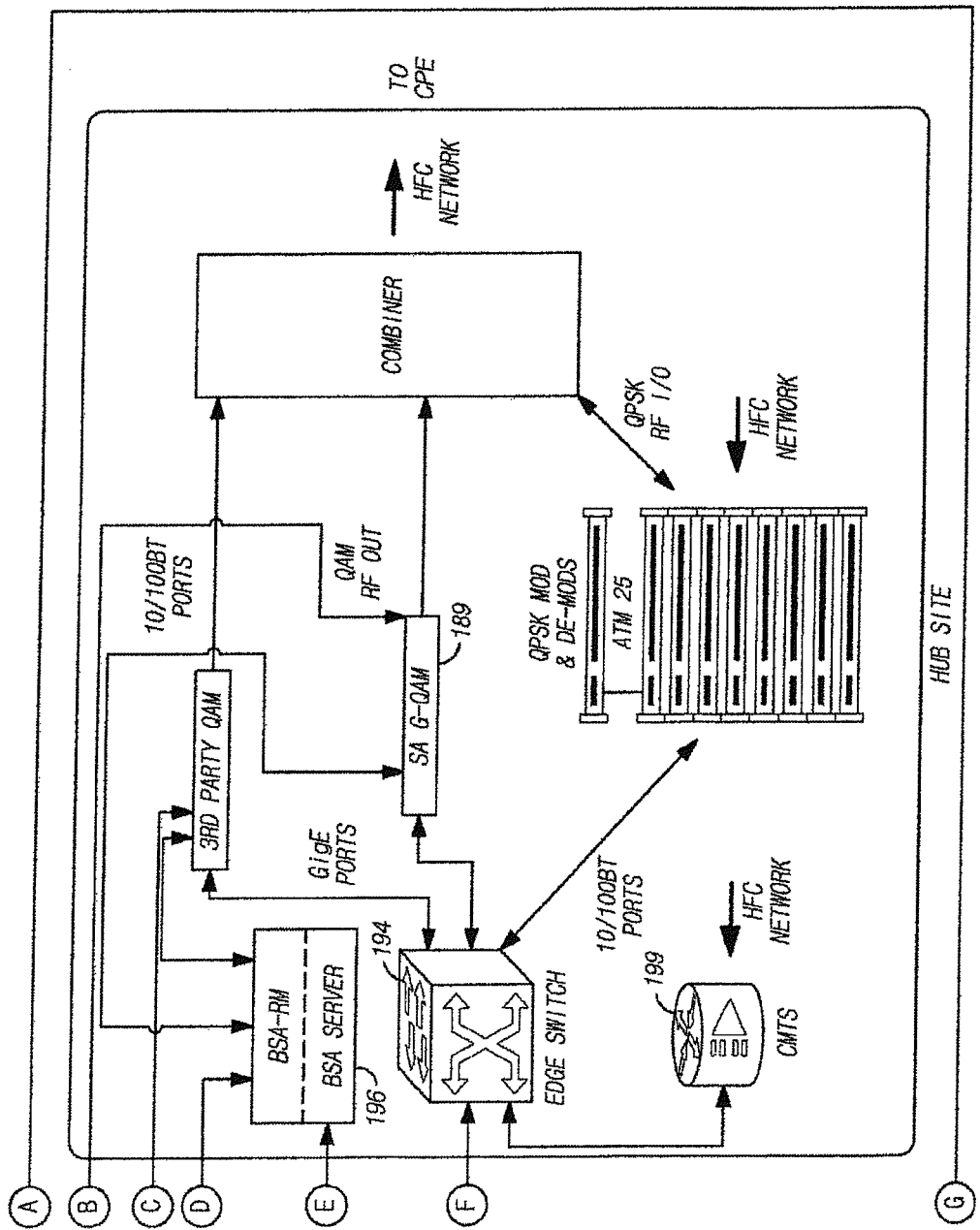

FIG. 1*b* illustrates an exemplary "switched" network architecture also useful with the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber is unaware of any difference between programs delivered using a switched network and ordinary streaming broadcast delivery.

FIG. 1*b* shows the implementation details of one exemplary embodiment of this broadcast switched network architecture. Specifically, the headend 150 contains switched broadcast control and media path functions 190, 192, these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned U.S. patent application Ser. No. 09/956,688 filed Sep. 20, 2001 and entitled "Technique For Effectively Providing Program Material In A Cable Television System", which is patented as U.S. Pat. No. 8,713,623 on Apr. 29, 2014, incorporated herein by reference in its entirety, describes one exemplary broadcast switched digital architecture useful with the present invention, although it will be recognized by those of ordinary skill that other approaches and architectures may be substituted.

Referring again to FIG. 1*b*, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPE. The IP packets are typically transmitted on RF channels that are different than the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

"Packetized" Networks—

Figure 1C:
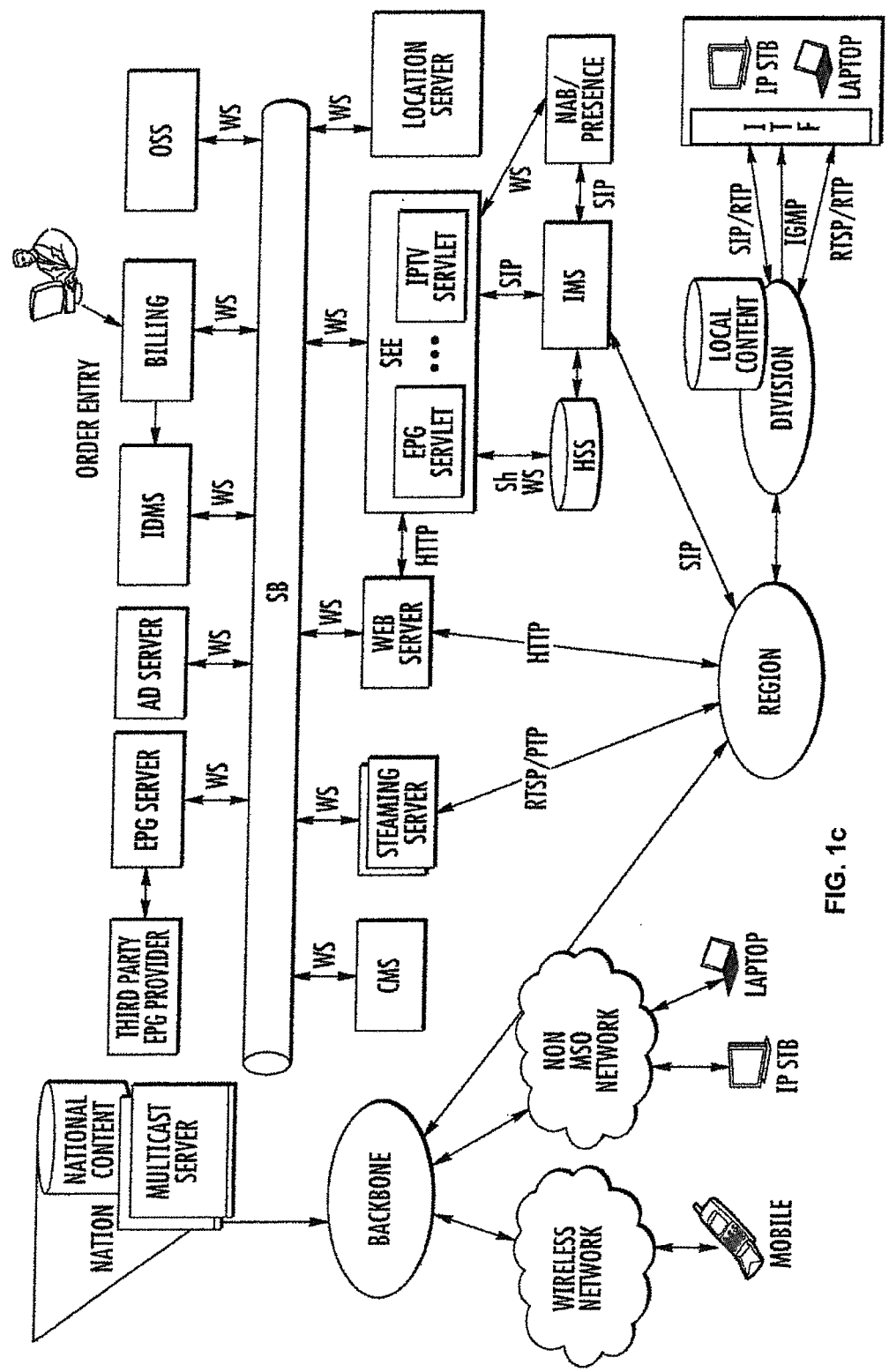
FIG. 1c is a functional block diagram illustrating one exemplary packetized content delivery network architecture useful with the present invention.
Figure 2A:
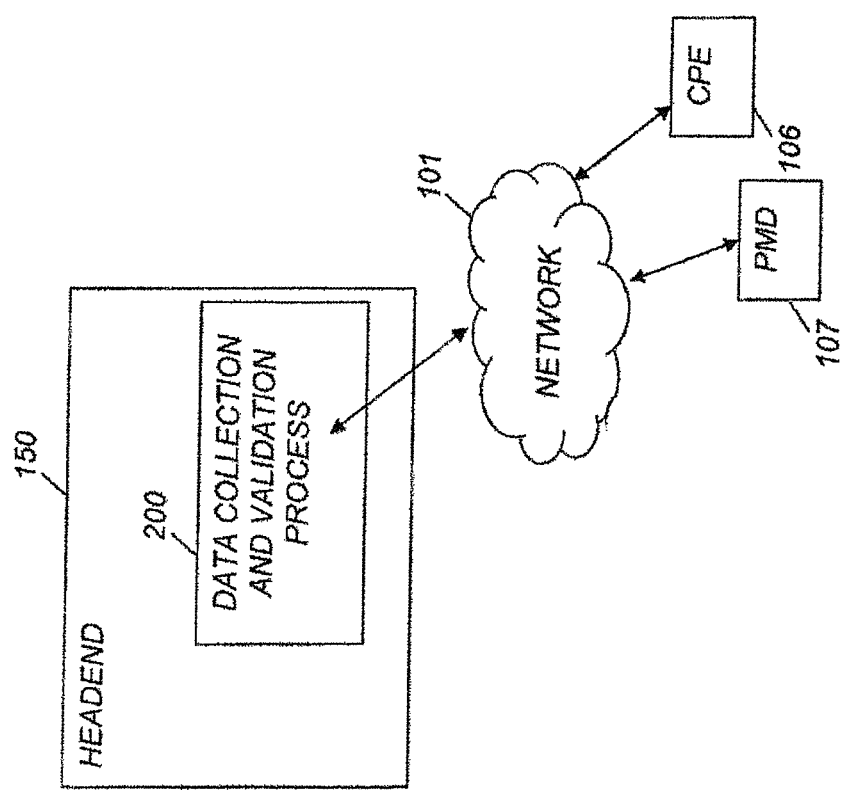
FIG. 2a is a functional block diagram illustrating a first embodiment of a data collection and validation architecture configured in accordance with the present invention.

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the present invention, a "packet optimized" delivery network is used for carriage of the packet content (e.g., IPTV content) when the request issues from an MSO network (see discussion of FIG. 2*a* below). FIG. 1*c* illustrates one exemplary implementation of such a network, in the context of an IMS (IP Multimedia Subsystem) network with common control plane and service delivery platform (SDP), as described in co-pending U.S. Provisional Patent Application Ser. No. 61/256,903 entitled "METHODS AND APPARATUS FOR PACKETIZED CONTENT DELIVERY OVER A CONTENT DELIVERY NETWORK", incorporated herein by reference in its entirety. Such a network provides significant enhancements in terms of common control of different services, implementation and management of content delivery sessions according to unicast or multicast models, quality-of-service (QoS) for IP-packetized content streams, service blending and "mashup", etc.; however, it is appreciated that the various features of the present invention are in no way limited to any of the foregoing architectures.

Data Collection and Validation Architecture—

Referring now to FIG. 2, a high-level block diagram of a data collection and validation architecture configured in accordance with one embodiment of the invention is illustrated.

The architecture of FIG. 2 generally provides a mechanism whereby data regarding a subscriber's usage and interaction with content is collected and validated. The architecture comprises a network including a data collection and validation entity process 200 disposed at a network headend 150 or other location. The collection and validation entity 200 is in communication with a plurality of user devices, such as e.g., CPE 106, personal media devices (PMD) 107, laptop and personal computers (PC), set top boxes (STB), digital video recorders (DVR), etc., via the network 101. As described subsequently herein, the entity (process) 200 may take the form of a software process, hardware device, combination of hardware and software, or any other form suitable to achieve the desired degree of automation and processing.

Data regarding activity taken with respect to content on the user devices is collected and analyzed at the data collection and validation entity 200. The collection and validation entity 200 may record data such as that relating to the request and receipt of content at the devices (CPE 106, PMD 107, etc.). For example, the collection and validation entity 200 may collect data regarding the number of times a particular content element (e.g., movie, game, etc.) is requested. The data collection and validation entity 200 may also collect data regarding events or functions such as trick mode operations employed with respect to content including e.g., fast forward, rewind, pause, play, etc. This data may be analyzed with respect to the requesting devices, including e.g., the frequency of fast forward requests during certain types of programming, the subscriber associated to the device, group of subscribers, devices, households, geographic or demographic areas, etc.

This data is then analyzed (as discussed below) to generate so-called "meaningful data", such as reports regarding the number of requests by one or more subscribers, devices, households, geographic zones, demographics, etc. or over a particular time period. That is to say, the raw data is often too voluminous and detailed in its initial form to be useful; thus, it is transformed into information that can be directly applied, through both reporting systems and automated platforms, to making business decisions or taking operational action. The data may be for instance transformed so as to be more easily digestible, and/or be processed (e.g., filtered, reformatted, checked for consistency, etc.).

Data regarding the user's interaction with content may include interaction with various different types or delivery modes of content. For example, data may be collected regarding the users interaction with linear and/or switched digital broadcast content, VOD/MVOD/FVOD (or other type of on-demand content), content from a personal video recorder (PVR) or digital video recorder (DVR), IPTV content, etc. Further, the requested/provided content may comprise, for example, so called "quick clips" content (described in co-owned U.S. Pat. No. 7,174,126 issued Feb. 6, 2007 and entitled "TECHNIQUE FOR EFFECTIVELY ACCESSING PROGRAMMING LISTING INFORMATION IN AN ENTERTAINMENT DELIVERY SYSTEM" incorporated herein by reference in its entirety), so-called "start-over" content (described in co-owned, co-pending U.S. Patent Publication No. 2005/0034171 entitled "TECHNIQUE FOR DELIVERING PROGRAMMING CONTENT BASED ON A MODIFIED NETWORK PERSONAL VIDEO RECORDER SERVICE" incorporated herein by reference in its entirety), so-called "lookback" content (as described in co-owned, co-pending U.S. patent application Ser. No. 10/913,064 filed Aug. 6, 2004 and entitled "TECHNIQUE FOR DELIVERING PROGRAMMING CONTENT BASED ON A MODIFIED NETWORK PERSONAL VIDEO RECORDER SERVICE" incorporated herein by reference in its entirety), and/or so-called "remote DVR" content (as discussed in co-owned U.S. Pat. No. 7,457,520 issued Nov. 25, 2008 and entitled "TECHNIQUE FOR PROVIDING A VIRTUAL DIGITAL VIDEO RECORDER SERVICE THROUGH A COMMUNICATIONS NETWORK" incorporated herein by reference in its entirety). Still further, enhanced access to premium based content which is not available to non-subscribers, or which cannot be delivered across traditional transport may also be provided, such as e.g., behind the scenes outtakes, alternate endings, actor interviews, etc. and data collected relating thereto as well.

Additionally, it is appreciated that a user's requests for and interactions with non-content data (such as high-speed data) as well as interactive content may also be monitored according to the herein described systems and methods. For example, where a subscriber to the MSO network is provided access to telephone (e.g., VoIP), Internet and interactive content services, the collection and validation entity 200 may generate records relating to e.g., time spent (such as number of hours spent online, number of calling minutes used, number and types of interactions with interactive content). This information may then be analyzed by e.g., day, device, household, geographic area, or demographic sector, type of content accessed, etc. In one example, the content may comprise interactive content such as that described in co-owned, co-pending U.S. patent application Ser. No. 12/582,619 filed Oct. 20, 2009 and entitled "GATEWAY APPARATUS AND METHODS FOR DIGITAL CONTENT DELIVERY IN A NETWORK", and in co-owned U.S. patent application Ser. No. 12/582,653 filed Oct. 20, 2009 and entitled "METHODS AND APPARATUS FOR ENABLING MEDIA FUNCTIONALITY IN A CONTENT-BASED NETWORK", which is patented as U.S. Pat. No. 8,369,055 on Mar. 12, 2013, each of which is incorporated herein by reference in its entirety.

Figure 2B:
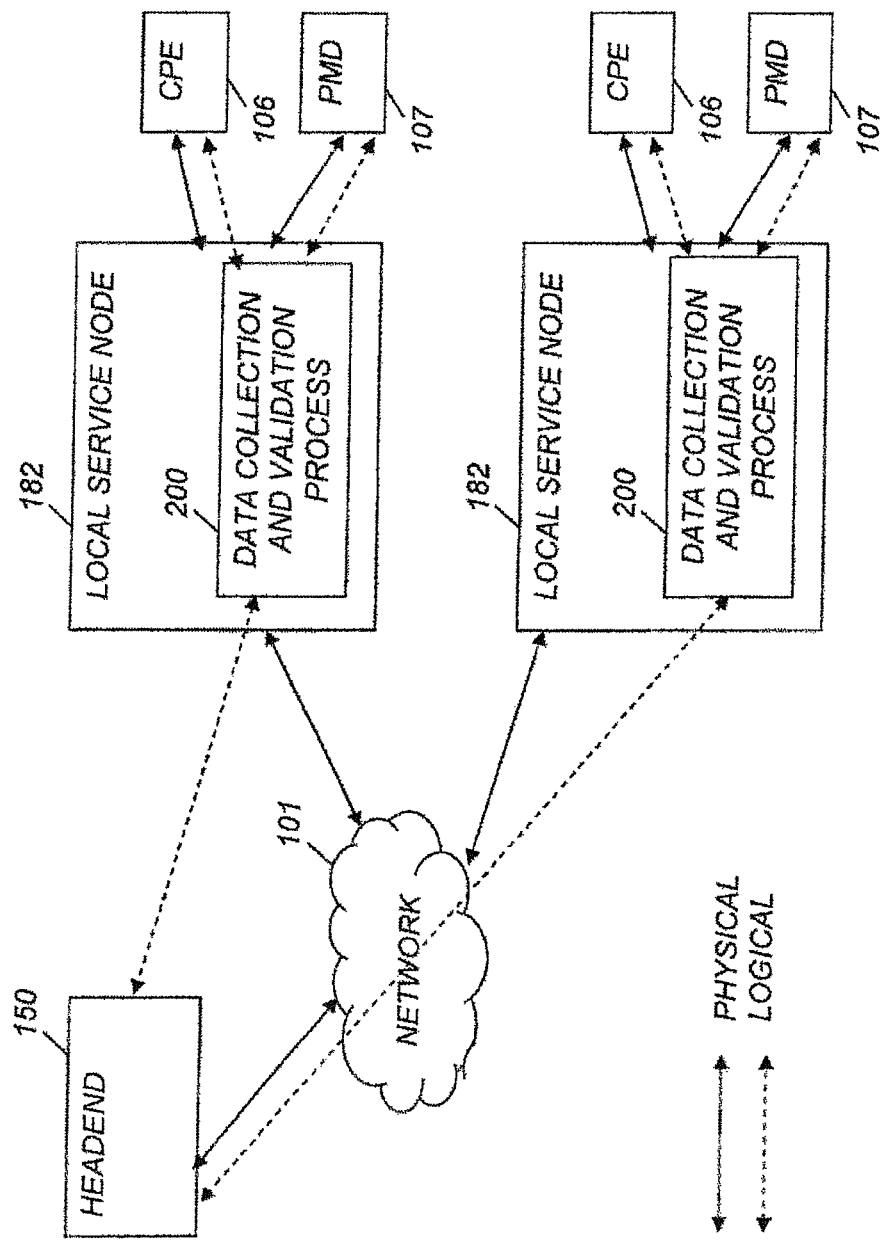
FIG. 2b is a functional block diagram illustrating a second embodiment of a data collection and validation architecture configured in accordance with the present invention.

Referring now to FIG. 2b, another embodiment of an architecture for data collection and validation is given. As shown, in the embodiment of FIG. 2b, the data collection and validation entity 200 (and resultant functionality) may be placed further towards or at the "edge" of the network. That is, in this embodiment, the collection and analysis functions are performed by a data collection and validation entity process 200 located at individual ones of the service nodes 182. According to this embodiment, information regarding a user's interaction with content is collected and validated at the node. This validation may be complete (e.g., the node performs all processing required), or partial (i.e., the node performs some of the requisite processing, and another process such as one disposed at the headend 150 performs additional processing). Then, the completely or partially analyzed data may be returned to a headend 150 entity or a third party (not shown).

Figure 2C:
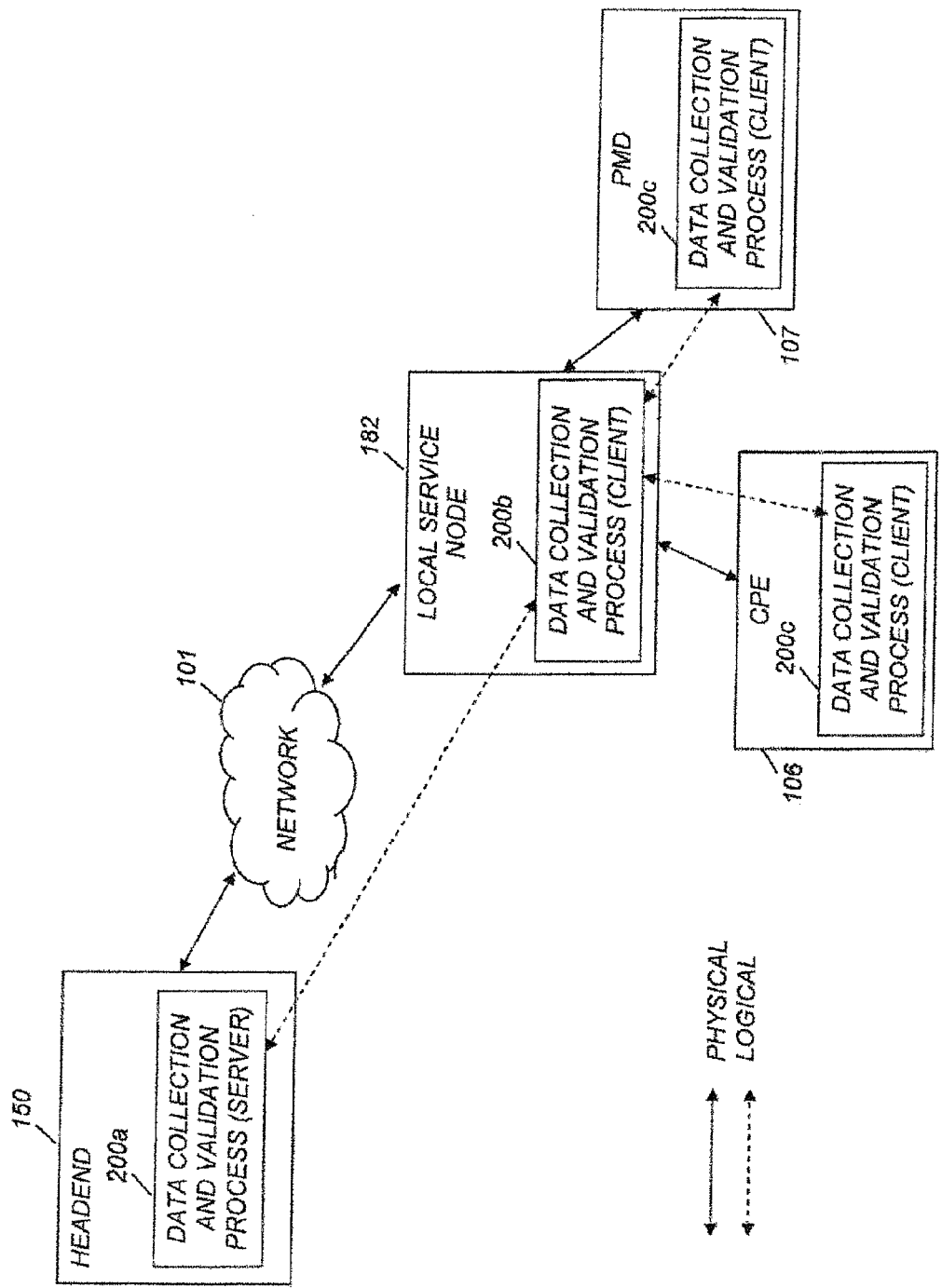
FIG. 2c is a functional block diagram illustrating a third embodiment of a data collection and validation architecture configured in accordance with the present invention.

In the embodiment of FIG. 2c, the functionality of the data collection and validation entity is spread across one or more of a headend entity, service node entity, and the CPE 106 and/or PMD 107, such as in the form of a distributed application. Hence, rather than comprising a separate entity, the data collection and validation application 200c running on the CPE 106 (or PMD 107) cooperates with an application 200b running at the service node and/or an application 200a running at the headend 150 to perform the functions discussed above. In other words, the aforementioned applications (200a, 200b, and 200c) work together to collect and validate user activity and interaction data.

Figure 2D:
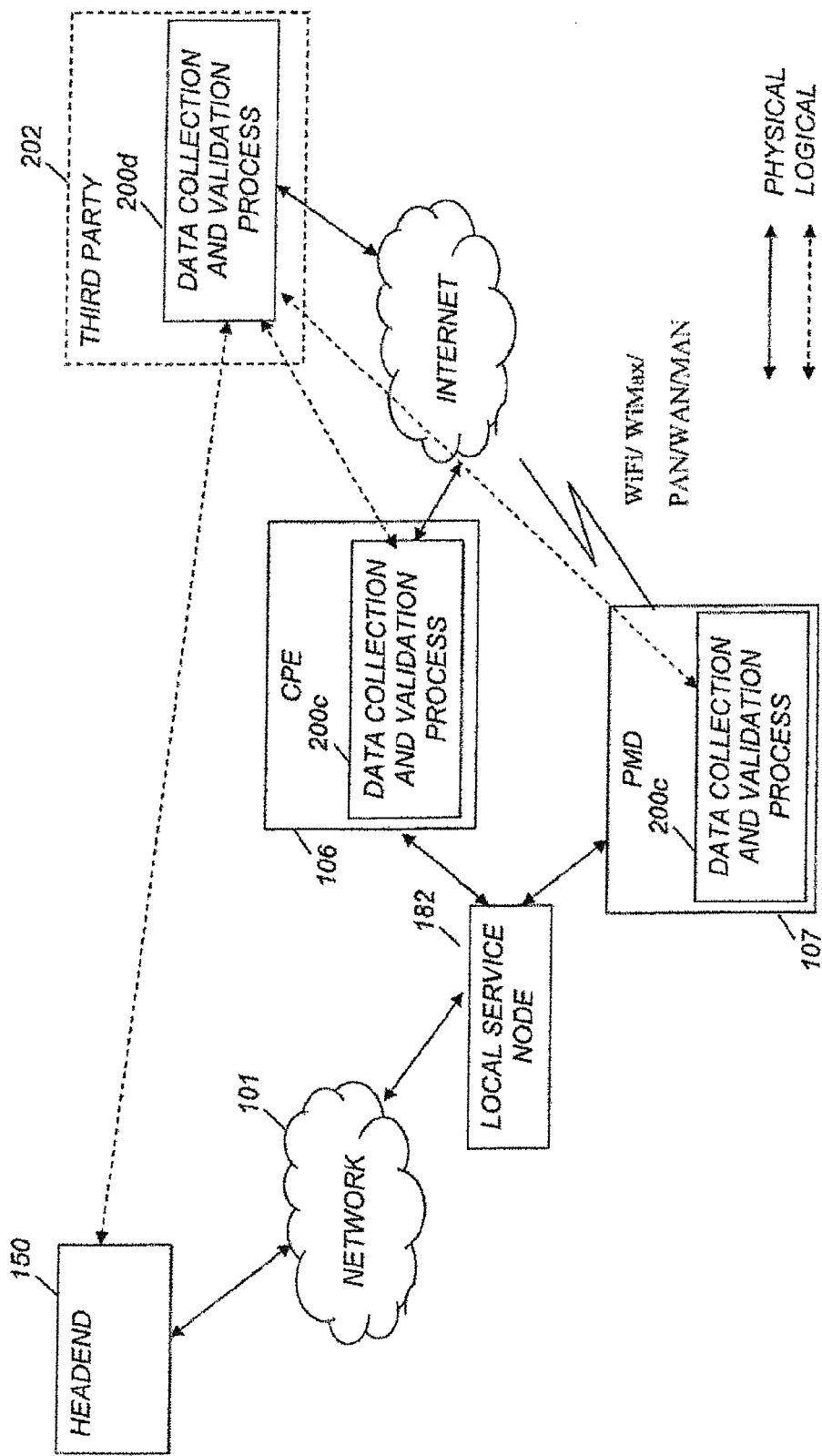
FIG. 2d is a functional block diagram illustrating a fourth embodiment of a data collection and validation architecture configured in accordance with the present invention.

FIG. 2d illustrates yet another embodiment of an architecture for data collection and validation according to the present invention. In this embodiment, a data collection and validation application 200c is run on the user device (such as e.g., CPE 106 and PMD 107). The application 200c on the user device communicates with a similar application run at a third party entity 202, such as the data collection and validation application 200d. For example, data collection may be directed by the user application 200c and, upon request from the third party application 200d (or at specified intervals, such as via a polling scheme), the data is transmitted from the user application 200c to the third party entity 201 for validation (and other analysis) via the third party application 200d.

Alternatively, the CPE 106 (or PMD 107) application may be configured to perform at least some of the validation (and other analysis) functions prior to transmission of the data to the third party 202. In this manner, any business rules or MSO controls which are to be implemented may be performed at the CPE 106 (or PMD 107) under the direct control of the MSO (or according to indigenous programming pre-positioned by the MSO within the logic of the client application); the third party entity 201 merely receives "pre-packaged" data.

The third party entity 202 may be in direct or indirect communication with the headend 150 in certain embodiments.

The communication between the CPE 106, PMD 107 and the third party entity 202 occurs via any number of different modes such as e.g., the Internet. In one implementation, this communication "piggybacks" or extends an existing protocol for the transmission of data, although a dedicated protocol specifically for this purpose may be used as well. The user devices communicate data to and from the Internet via literally any wired (e.g., Ethernet, DSL, cable, fiber, and optical wireline connections) or wireless (e.g., Wi-Fi, WiMAX, WAN, PAN, MAN) networking standard.

The embodiment of FIG. 2d may be useful, for example, in a network where there is not two-way communication between the content delivery network (e.g., headend 150) and the user devices (e.g., CPE 106, PMD 107), for example, some satellite content delivery networks. In this embodiment, content is delivered via the aforementioned delivery network, while data regarding the user's interaction with content is collected and transmitted via e.g., a so-called "over the top" IP backhaul to the third party entity. Alternatively, broadband, DSL/dial-up backhauls from the target premises may be utilized to transmit tuning or other useful information to a third party (e.g., third party website). The data may be transmitted to an entity associated with the content delivery network rather than a third party (not shown) and/or the third party entity 202 may communicate the information back to the MSO headend. In other words, the third party collects the data and analyzes it, or may send the data back to the satellite MSO (or caches the data first, and sends it up to the MSO at a later time).

Data Collection and Validation Methodology—

Figure 3:
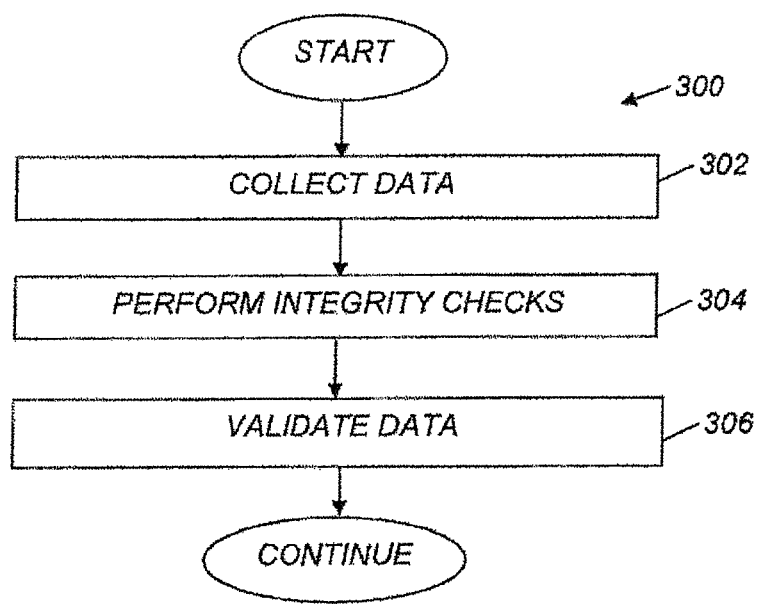
FIG. 3 is a logical flow diagram illustrating an exemplary embodiment of the generalized method for collecting and validating data according to the present invention.

FIG. 3 illustrates an exemplary embodiment of the general methodology for data collection and validation according to the invention. As shown, per step 302, data is collected. As noted above, the data may comprise data relating to the interaction of a specified user or user device with content (including requests for content, trick mode operations, tuning events, etc.). Also, data may be collected via calls or requests issued from a data collection and validation entity 200 located at e.g., the network headend 150 or a service node thereof. Alternatively, the data may be collected via distributed application, including an application running at the CPE 106 or PMD 107.

Moreover, the data may have been already collected (and is in effect sitting in a data repository waiting to be analyzed), or may be contemporaneously collected and analyzed "on the fly".

Next, at step 304, one or more integrity checks are performed on the data. Examples of integrity checks will be discussed in greater detail below. The integrity checks represent mechanisms for indicating when the data received may be incorrect, such as because it is outside of an expected value. For example, the file size of data received may be checked against a cumulative average of file sizes over a specified period. In one embodiment, the cumulative average is derived using one or more of linear, log-log- or log-linear regression methods.

Regression analysis is generally used to estimate the conditional expectation of dependent variables given the independent variables. In one embodiment, the conditional expectation is the average value of the dependent variable with the independent variables held fixed. The variation of the dependent variable with respect to the conditional expectation may be monitored and, as discussed herein, rules may be implemented for establishing what will be considered significant variation from the expected result so as to comprise an "error".

At step 306 the collected data is validated against the aforementioned rules for each integrity check. In other words, the data is considered "valid" if it is within the range of acceptable data for that integrity check. When monitoring an entire delivery system, it is cost prohibitive to complete all of these validity checks manually. Hence, in the present invention, an automatic system is utilized to validate the data and notify an operator on an exception basis when any of the aforementioned integrity/validity checks fails.

For certain types of integrity checks, a Boolean indicator may be used to indicate whether the check was passed or failed. For example, an integrity check to determine whether files were imported correctly into a database would necessitate automated check amounts as Boolean indicators. If data does not import, then a flag indicating the import failure is sent to the operator. However, for other integrity checks (e.g., evaluating data over time), a Boolean indicator may not be appropriate to indicate a failure or error. That is to say, in the example given, a Boolean operation cannot be applied to data on an "incremental" day to determine whether or not there is a failure as the data is taken over time. In such cases, the data is collected and measured over time and an "expected" value is derived therefrom. Then, the system can define an error condition, where the data is outside the expected value. To ensure that the system only notifies the operator at errors worthy of alerting, an acceptable tolerance of the expected value is defined, and data within the tolerance is deemed "valid". In other words, the process of determining whether the collected data is within the acceptable tolerance range for an integrity check is discussed herein as validation.

In one embodiment, the acceptable tolerance is determined by configuring a regression period. The regression period may include multiple elements such as:

1) Absolute or relative length of time (e.g. 1 week, 1 month, or 3 months from a given point in time, or between fixed dates, etc.)
2) Sample timeframe within the period (e.g. hourly, daily, weekly, day-over-day, week-over-week, etc.)
3) Type of regression to apply (e.g., log linear or standard linear regression)

Once the regression period is defined, the network operator may test the "fitness" of a regression against historical data, in order to ensure that it is appropriate before it is implemented on a large scale. In other words, it may be determined whether the acceptable tolerance is too high or too low by implementing the regression period on a portion of the larger population of data. When the network operator (or an automated process designated to perform such a trial evaluation) is satisfied with the regression period for a given metric, the regression period is then put to production (i.e., data is validated given the determined regression period), thus enabling real-time monitoring and notification.

Figure 3A:
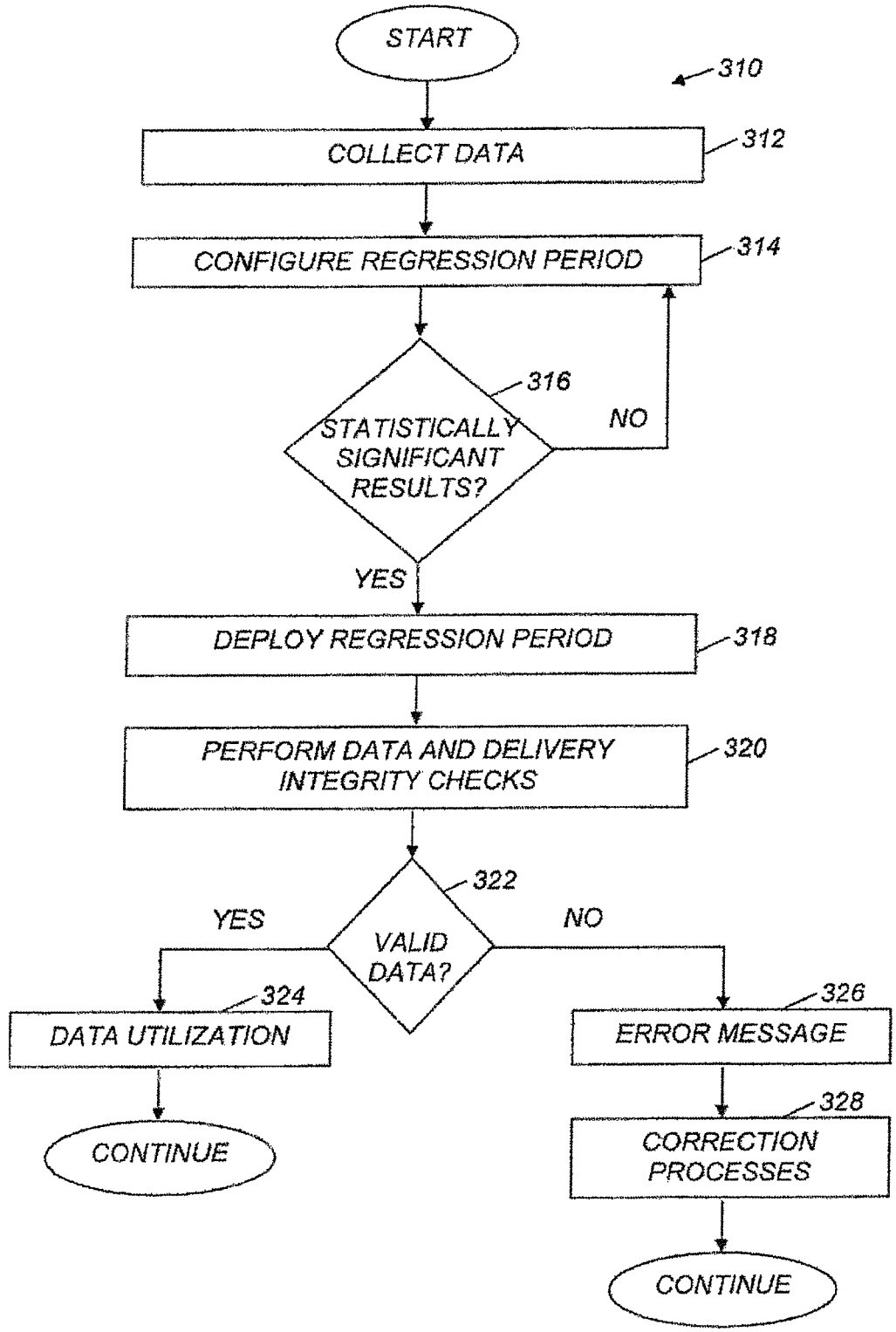
FIG. 3a is a logical flow diagram illustrating one implementation of the generalized method of FIG. 3.

Referring now to FIG. 3a, one implementation of the generalized method for data collection and validation of FIG. 3 is illustrated. Per step 312, data regarding a user's requests for and interaction with content is collected (or obtained after having been previously collected). Then, per step 314, a regression period is configured. As discussed above, the regression period is a tool used by the network operator to establish boundaries for the amount of variation from the average (as obtained via regression analysis) which will be considered acceptable when receiving data, i.e., the range for "valid" data.

Hence, at step 314, the network operator (or designated routine) may enter configuration parameters indicating an acceptable level of variance from the expected result. Each of the herein described integrity checks which will be employed are configured at this step. A test sample of data is may be run to determine whether the operator-entered parameters are acceptable (i.e., whether there is a correlation between the independent variables and the dependent variables that enables a regression model to be built). If the entered parameters are useful, they may be used as default values, if not, new parameters may be entered.

The statistical significance of the model may then be monitored over time to determine if the model is valid. The "significance" of the correlation of the independent and dependent variables (e.g., is it accidental, a coincidence of the data, or is it causal) may not be particularly high, indicating that the model has limited predictive capability, or the data is insufficient in some capacity. For example, if the parameters indicate too low of a threshold for finding error, many errors will be found which are not in fact errors (i.e., too much of the data will be determined to be invalid which is not actually invalid); likewise, if the parameters are set so as to provide too high of a threshold, erroneous data will not be identified (i.e., too much invalid data will be determined to be valid). Thus, at step 316, the statistical significance of the results of the configured parameters is determined. If the results are not statistically significant, such as because too many errors are being identified, or too many errors are not being identified, then the network operator (or designated algorithm) continues to configure the regression period.

If at step 316, it is determined that the results are significant (i.e., the configuration parameters yield acceptable results), the regression period is deployed or implemented on the full data set (step 318). In other words, once it is apparent that the configuration parameters are acceptable, the regression period may be put into use on all or selected subsets of subsequent collected data as a validation parameter.

At step 320, a series of data integrity checks and delivery integrity checks are performed. The data integrity checks comprise checks which are used to examine the actual data being transmitted. For example, data integrity checks may include checking the total number of user devices in each zip code to determine whether this number is "valid" or within the expected number of devices for the zip code. Conversely, the delivery integrity checks comprise checks which are used to examine whether the data was delivered properly. Data integrity checks are generally performed to ensure that the content of the data may be relied upon (e.g., to ensure the validity of what was received). For example, data integrity checks may include checking the file size of the received data.

Delivery integrity checks may are generally performed to ensure that the data transmission occurred without error (e.g., to ensure that what was received was what was expected).

Next, at step 322, the validity of the data is determined. Continuing the examples from above, with respect to the example data integrity check, a certain number of user devices are expected (expected result or expectation value); if the number received matches the number expected (or is within the permitted variation or variance thereof, such as according to the configuration parameters), the check is successful and the data is deemed valid. Accordingly, the data may be utilized (step 324) for further analysis (discussed elsewhere herein).

It is noted that as used herein, the terms "variance", "deviation" and "variation" may be used in the general sense (e.g., an allowable tolerance or band of variation, such as "X+/−Y"), or in the more specific statistical sense (e.g., the standard deviation (s), or the standard deviation squared ($s^2$) commonly known as variance).

If the number received does not match the number expected, or is not within the permitted variance thereof, the check is unsuccessful, and an error message is generated (step 326) and displayed to the network operator (and/or optionally logged into an error log file or other data structure). As will be discussed elsewhere herein, an error correction process is then implemented (step 328), although error correction may also be performed en masse on errors identified throughout the validity determination process (such as being performed on all identified errors at the end of the validity check).

With respect to the second example above, a certain file size is expected; if the size of the data received matches the expected size or is within the permitted variance thereof, the check is successful and the data is deemed valid, and may be utilized (step 324). If not, the check is unsuccessful, and an error message is generated (step 326) and optionally logged as described above. Also discussed elsewhere herein, the network operator (or management algorithm), once the error message is received or the log examined, may manually correct the error, and/or an error correction process (e.g., an automated process) may be implemented (step 328).

Figure 3B:
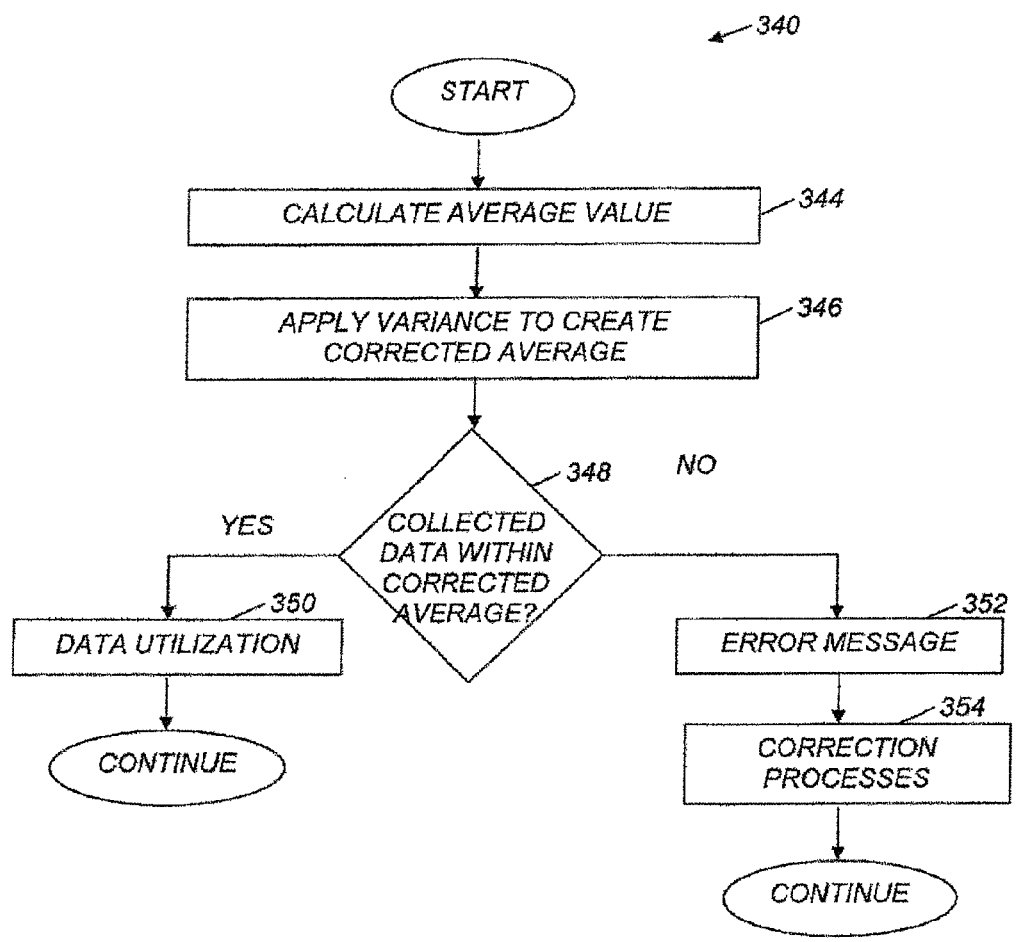
FIG. 3b is a logical flow diagram illustrating an exemplary embodiment of the method for performing data and delivery integrity checks according to the present invention.

FIG. 3b illustrates an exemplary embodiment of the method for performing data and delivery integrity checks and validating the data collected is within an acceptable range for each integrity check according to the present invention. As noted previously, various data and delivery integrity checks may optionally be performed on the collected data. The method generally applies to each of the herein described integrity checks.

As discussed above, data is collected (see e.g., step 312 of FIG. 3a). The type of data collected varies based on the check to be performed. For example, the data collected at step 342 may comprise tuning event data.

At step 344, statistically relevant values (e.g., average values in one embodiment) are calculated for previously collected data. As discussed earlier herein, in one embodiment, the average values are derived based on previously collected data using statistical regression techniques (e.g., linear, log-log, or log linear regression over a moving or expanding window of time). Linear and log regression techniques are well known to those of ordinary skill in the mathematical arts (see, e.g., Draper, N. R. and Smith, H. *Applied Regression Analysis* Wiley Series in Probability and Statistics (1998), incorporated herein by reference in its entirety), and accordingly are not described further herein.

The calculation of average data values in this way enables the system to continually adjust or learn based on the data as it is collected. The average values may be entered manually (e.g., to correct an obviously invalid or erroneous result), or "seeded" initially so as to provide the algorithm with an initial basis or starting point. The seed or default values may be selected as discussed above, e.g., based on what is known about the system. Then, as also previously discussed, the model may be monitored to determine if the results given are statistically significant (or for another performance metric). If so, the default value may be used as an "expected value". If not, the operator may enter a different seed or default value.

At step 346, a variance is applied to the average value to arrive at a corrected average. As noted above, the level of permissible variance or variation above and below the previously calculated average may be determined by modification to one or more configuration parameters by a network operator or management algorithm until a statistically significant result is arrived at. Then, per step 348, it is determined whether the collected data is within the corrected average, i.e., is within the level of permissible variation or bounds.

If the collected data is within the bounds of the corrected average, the data may be utilized (step 350). However, if the data is not within the corrected average bounds, an error message is presented (step 352), the error(s) optionally logged, and a correction process implemented (step 354).

The data integrity checks performed via the method of FIG. 3*b* may include e.g.: (i) a tuner identity distribution and value check, (ii) a client device count by zone check, (iii) a client device count by channel map check, (iv) an average rating across all networks per day check, (v) a number of programs per channel check, (vi) a number of advertisements per advertisement (or other) zone check, (vii) a number of advertisements per network check, (viii) a tune-out type distribution (i.e., tuning patterns) check, (ix) a number of tuning events by client device by day check, and/or (x) a count of tuning events by broadcast switched architecture (BSA) or on-demand (OD) server check. Each of the foregoing will be discussed in greater detail below; however, other data integrity checks may also be utilized, the data integrity checks discussed herein being merely illustrative of the general principles of the invention.

The delivery integrity checks performed via the method of FIG. 3*b* (as contrasted with the data integrity checks described above) may include e.g.: (i) a file size check, (ii) a check for the number of rows in a file, (iii) a data type check, (iv) a mandatory field check, (v) a content validity check, and (vi) a data consistency and entity relationship check. Each of the foregoing checks will be discussed in greater detail below. However, it will be appreciated that yet other data integrity checks may also be utilized (whether in place of one or more of the above, or in conjunction with them), the data integrity checks discussed herein being merely illustrative of the general principles of the invention. For instance, cyclic redundancy codes (CRCs), physical layer processes such as forward error correction (FEC), integrity checking through use of a cryptographic hash, and so forth, may be used to determine if the data has been transmitted and received properly and completely, has been tampered with (e.g., subjected to "man-in-the-middle" or similar attacks), etc.

Data Integrity Checks:

(i) Tuner Identity Distribution and Value Check—

The tuner identity distribution and value check comprises a count of tuning events on a particular client device (such as e.g., CPE 106 and/or PMD 107) over a predetermined periodicity (e.g., daily). The tuning events may be analyzed by tuner identity, and/or by client device (e.g., DSTB) model. The tuning events may include data regarding the user's interaction with content such as e.g., content requests, trick mode operations, tune-out/away events, etc. Since the check is performed on an entire period's (e.g., day's) worth of data, the check is run on the period after the close of the period of interest (e.g., the day after for the previous day's collected data).

The exemplary tuner identity distribution and value check utilizes the method discussed above with respect to FIG. 3*b*. Accordingly, tuning event data is collected and, an average value is determined. During the tuner identity distribution and value check, the average value computed comprises a cumulative average of tuning events for a particular client device (identified by tuner identity and/or by client device model), averaged over the day of the week (e.g., M, Tu, W, Th, F, Sa, Su), and/or by the number of elements taken in the average (such as 30 days, 60 days, 90 days, etc.). As discussed above, a variance or variation is applied to the average to create a "corrected average". The variance applied in one embodiment is the percent of daily count values of tuning events on a client device (by tuner identifier and/or by client device model) for which it is permissible to deviate from the average for that day of the week (as determined over the previous 30 days, 60 days, 90 days, etc.). Alternatively, in a statistical embodiment, the standard deviation (s) or variance ($s^2$) is used as the basis for an acceptance criterion (e.g., one-sigma, three-sigma, etc.).

(ii) Client Device Count by Zone Check—

The client device count by zone check is a daily count of client devices (identified by e.g., client device model) in a geographic area. The client device count by zone check is also a data integrity check which is performed according to the method of FIG. 3*b*.

In one embodiment, the geographic area is defined by a zip code. Other alternative or additional divisions may be created based on other geographic boundaries such as e.g., area codes, service groups, advertisement zones, or non-geographic zoning such as e.g., demographic or psychographic groups, etc. These groupings or zonings may be used individually or in conjunction with one or more other groups or zones to analyze collected data as discussed herein.

In yet another embodiment, the zip code or other zoning identifier may be maintained for all of a user's devices, including those devices which receive IP packetized content, or non-legacy content. Such devices may include for example the user's devices may include a DSTB, residential gateway, DVR, PMD, PC, laptop or handheld computer, gaming device, or smartphone. In one implementation, the apparatus and methods discussed in co-owned, U.S. patent application Ser. No. 12/766,753 entitled "Zone Control Methods and Apparatus" and filed on Apr. 23, 2010, which is patented as U.S. Pat. No. 8,701,138 on Apr. 15, 2014, which is incorporated herein by reference in its entirety, may be utilized to maintain the association of a device to a particular zone regardless of the actual physical location of the device. As discussed therein, in one embodiment, a non-legacy device is associated with a user's zone by introducing a link between a server providing content to the device (e.g., a VOD server or web server) and a server which has the ability to determine an appropriate zone for the user. This is accomplished for example by associating each user with a zone identifier. Alternatively, the foregoing may be accomplished by associating each user with a device that is associated with a physical hub or node identifier, which, in turn, is associated with a zone identifier. In yet another variant, a service group identifier (rather than zone identifier) may be used.

Since the check is performed in the exemplary embodiment on an entire day's worth of data, the check is run on the day after for the previous day's collected data. Performance of the client device count by zone check according to the method of FIG. 3*b* includes collecting data regarding the number of client devices in a predefined group (e.g., the geographic or other non-geographic group of devices). The predefined group may be selected, in one embodiment, by a network operator. In this manner, the network operator may perform the client device count by zone check for e.g., a particular zip code, area code, and/or demographic at the discretion of the operator, and in a varying manner.

Next, the total number of client devices in a division, zone, area, or zip code for a previous day and a total number of households in the same division, zone, area, or zip code for the same previous day are determined. An average of the client devices per household, division, zone, area, and/or zip code is then calculated for the previous day and compared to a cumulative average. The cumulative average is the average of the client devices per household (identified by e.g., client device model) in each division, zone, area, or zip code, averaged over the day of the week and/or the number of elements in the average (e.g., 30 days, 60 days, 90 days, etc.). As noted above, the collected data must be within an acceptable variance or deviation from the cumulative average. The level of variance or deviation is determined by network operator pre-configuration (discussed above). In one embodiment, the variance applied during the client device count by zone check is a percent of daily count values of number of client devices per household (by client device model) in each division, area, zone, or zip code for that day of the week (as determined over the previous 30 days, 60 days, 90 days, etc.).

In another implementation, the client device count by zone check may be a count by advertisement zone (ad zone).

(iii) Client Device Count by Channel Map Check—

The client device count by channel map check is another data integrity check which may be performed according to the method of FIG. 3b. The client device count by channel map check is a daily count of client devices tuned to each channel for a previous day by division identity (or other indicator of a geographic, demographic, or other zone) and/or by BSA server. The collected data represents the number of client devices which tuned to each channel over the previous day. For example, a number of devices which tuned to Channel X at least once over the day are calculated. In the instance a particular device tunes to Channel X, tunes away, and later tunes back, the device will be counted twice. In other words, each tune-in instance is counted as a separate device count in one implementation of the invention. Alternatively, a single device may only be counted once despite the number of tune in/out events.

The average calculated at step 344 of the method may, in one instance, comprise a cumulative average of the number of client devices tuned to each channel averaged over the day of the week and/or the number of elements in the average (e.g., 30 days, 60 days, 90 days, etc.). The variance or variation applied at step 346 may in this embodiment be e.g., a percent which the daily count values of the number of client devices is allowed to vary for each channel for that day of the week (as determined over the collected 30, 60, 90, etc. days).

(iv) Average Rating Across all Networks Per Day Check—

The average rating across all networks per day check is yet another data integrity check which may be performed according to the method of FIG. 3b. This check is performed in one embodiment by collecting information regarding tune in/out events per network. In other words, the collected data represents the number of client devices which tuned to each network over the previous day. For example, a number of devices which tuned to Network A at least once over the day are calculated. In the instance a particular device tunes to Network A, tunes away, and later tunes back, the device will be counted twice. As above, each tune-in instance is counted as a separate device count in one implementation. In another embodiment, a single device may only be counted once despite the number of tune in/out events.

The calculated average for the average rating across all networks per day check is the determined average number of client devices per network, household, region (such as by service group, zip code, advertising, or other zone, etc.), group (such as demographic or psychographic), day part (such as morning, afternoon, primetime, late night, etc.), by day of the week, and/or by month.

(v) Number of Programs per Channel Check—

The number of programs per channel check is a daily count of the scheduled programs per day. The number of programs per channel check is performed in order to determine a correlation between a particular network, and the programs played on that network. In general, over time, a given network (e.g., TNT) will have the same number of programs over a period of time (e.g., 12 programs on Sundays). For example, suppose that the correlation check is applied to data collected on a particular Sunday, which only lists 2 programs. It may then be inferred that there is a problem with the data.

For this check, data is collected regarding the total number of programs viewed, requested, provided, and/or made available on a given channel. The data may be further subcategorized by day of the week, time of day, etc.

The data is compared to a cumulative average number of scheduled programs by channel averaged over the day of the week and/or the number of elements in average (30 days, 60 days, 90 days, etc.). If the data is within an acceptable percent variance or variation of the average, the data is deemed valid and may be utilized. If not an error message is generated and correction processes begin. The variance is in one implementation given as a percent the daily count value of a number of scheduled programs may be for that day of the week given the sample size on which the average is based.

(vi) Number of Advertisements Per Zone Check—

The number of advertisements per advertisement zone (or other zone) check is another data integrity check performed according to the method of FIG. 3b.

In one implementation, since the check is performed on an entire day's worth of data, the check is run on the day after for the previous day's collected data. During this check, data is collected regarding the number of advertisements in a zone (e.g., advertisement zone, zip code, area code, demographic group, service group, etc.). The data regarding the number of advertisements may be collected according to whether the advertisements were played uninterrupted, whether one or more trick modes (such as pause, rewind, fast forward, stop, etc.) were operated during the play out of the advertisement. Data may also be collected regarding tune-out or tune-away events that occurred during the play out of an advertisement. This information is valuable in assessing, inter alia, how "interesting" the advertisement was to a given viewer.

Next, an average is calculated for the number of advertisements per advertisement (or other) zone. The average may take into account whether the advertisements were played uninterrupted, whether trick modes were employed and/or whether tune out or tune away events occur during the play out of the advertisements. This check may utilize for example a cumulative average of the number of advertisements played out by zone averaged over the day of the week and/or the number of elements in the average. According to the method, the average is corrected by implementing a variance, or percent the daily count values of advertisements played out by zone may deviate from the average for that day of the week given the sample size.

(vii) Number of Advertisements Per Network Check—

The number of advertisements per network check is a data integrity check relating to a daily count of advertisements played out by a network for a previous day.

According to the method of FIG. 3b, data is collected regarding the number of advertisements per network. In other words, data is separately collected for each advertisement for each network. In one embodiment, the data may take into account whether the playback of the advertisements is uninterrupted and/or whether trick mode or tune-out or tune-away requests are received during the playback.

Next, at step 344, a cumulative average of advertisements played out per network averaged over the day of the week and/or the number of elements in the average is calculated.

As noted with respect to the other data integrity checks discussed herein, it is acceptable for the collected data to vary from the cumulative average a predetermined amount or percentage. Hence, the collected daily count values of advertisements played out by the network (for that day of the week and/or given the sample size) may be within a predetermined percentage or deviation from the average.

(viii) Tune-Out Type Distribution or Tuning Patterns Check—

The tune-out type distribution or tuning patterns check is data integrity check which generally comprises a periodic (e.g., daily) count of the tune-out types by day. The tune-out type distribution or tuning patterns check may be performed according to the method of FIG. 3b as well.

The tune-out type distribution or tuning patterns check includes collection of tune-out, tune-away and other tuning patterns data. For example, data may be collected regarding requests for new content during the play back of first content. Data may also be collected regarding requests for content which has been previously requested and viewed by the same device. Still further, data may be collected regarding other tuning patterns, such as channel surfing, channel hopping, etc. The data may be further subcategorized by network, channel, time of day, day of the week, type of content tuning out or away from (e.g., specific programming content, advertising content, etc.).

A cumulative average of the number of tune out types by day averaged over the day of the week and/or number of elements in the average (e.g., 30, 60, 90 days, etc.) is taken at step 344 of the method of FIG. 3b. The collected data is then deemed valid i.e., checked if it is within an appropriate level of variance or deviation from the cumulative average. As noted above, the level of variance/deviation is determined in one implementation by the network operator (or a management algorithm) prior to implementation of the data integrity check. Hence, the collected data (e.g., daily counts) may vary, within a given percent, from the cumulative average.

(ix) Number of Tuning Events by Client Device by Day Check—

A number of tuning events by client device by day check is a data integrity check which may also be performed according to the methods of FIG. 3b. This check is a daily count of the number of tuning events for each client device. Tuning events include requests for and receipt of content, tune-in events, tune-out events, and tune away events, channel and/or network surfing or hopping, etc. "Tune-in" events are measured as requests to view a particular program. "Tune-out" events refer to a user's request to no long view any programming, and "tune-away" events are measured as a request to view a second program while the user is currently viewing a first program. In one embodiment, the presence and/or absence of the viewer may be detected, so that instances of viewership may be associated with the user's actual presence at the play out device. Detection of the viewer(s) may be accomplished via e.g., interaction with remote controls or device manual controls, selection or occurrence of events that can only be initiated by a user when present, "heartbeat" functions such as those requiring the user to periodically reset them, motion detectors, acoustic sensors, infrared sensors, etc.

Previously collected data is used to calculate a cumulative average of the number of tuning events per client device, so that subsequently collected data can be compared to the average to determine the validity of the data. The collected data must be within a predetermined threshold relative the cumulative average in order to be considered valid. In one embodiment, the cumulative average is averaged over the day of the week and/or the number of elements in the average, and the permissible variance or deviation is given as a percent by which the daily count value of the tuning events may vary from average by device by day, type of content, channel, network, group (such as zone, zip code, service group, demographic).

(x) Count of Tuning Events by BSA or OD Server Check—

The count of tuning events by BSA or OD server check is a data integrity check which determines whether the number of tuning events is within an appropriate level for the BSA or OD server. Hence, data is collected regarding tuning events. As noted above, the tuning event data may include requests for and receipt of content, tune-in events, tune-out events, and tune-away events, channel and/or network surfing or hopping (e.g., rate at which events occur as a function of time), etc. Data regarding the presence and/or absence of the viewer may also be collected so as to associate tuning events with the user's actual presence at the play out device via e.g., interaction with remote controls or device manual controls, selection or occurrence of events that can only be initiated by a user when present, "heartbeat" functions such as those requiring the user to periodically reset them, motion detectors, acoustic sensors, and/or infrared sensors, etc.

The collected data is used to generate a cumulative average of the tuning events for each BSA and/or OD server (or other server). Alternatively, data may be collected for a group of servers whether or not these servers have a common attribute (such as service to a particular service group, advertising or other zone, or demographic). The cumulative average may be averaged over a given period; e.g., the day of the week, and/or the number of elements in the average (e.g., 30, 60, 90 days, etc.).

To be considered valid data, the collected data must be within a predetermined range of the cumulative average. This range represents the variance or percent the number of records, by delivery file, may vary for that day of the week (for the given sample). In one embodiment, this is a check placed on the "output" of SDA (e.g. after all data is ingested and utilized or otherwise processed, and "information" is being sent to data consumers). One delivery method is delivery in the form of so-called flat files (e.g., plain text or mixed text and binary file which contains one record per line/row, and no links to other files). If a flat file has too few records based on the regression model, there is a problem with the data. Additionally, if large variances from day to day, or from week to week, etc. are identified, then a problem with the data may be identified.

Delivery Integrity Checks:

(i) File Size Check—

The file size check is one type of delivery integrity check which may be performed according to the method of FIG. 3b. This check collects file size data. A cumulative average file size is calculated over a previous length of time e.g., 30 days. The cumulative average may also take into account the day of the week, time of day, etc. on which the file size data is collected. For example, it may be determined that on average, during so-called "prime time" hours (weekday evenings), an average file size might be larger than those collected on an average weekday afternoon.

The collected data is compared to the cumulative average to determine whether the file size is comparable to the average file size. Comparability includes allowance for a certain level of variance or deviation from the average file size as determined by a network operator.

(ii) Number of Rows in a File Check—

The check for the number of rows in a file is a daily count of the number of records by delivery file. In order to perform the check, a cumulative average of the number of records by delivery file averaged over the day of the week and/or the number of elements in average is taken. The received data is then compared to the average to determine whether it is in a pre-approved threshold of the average.

In one embodiment, the pre-approved threshold is determined by a percentage of the number of records by delivery file may vary from the previously derived average.

(iii) Data Type Check—

A data type check is a delivery integrity check which may be used to ensure that each of the fields has the appropriate type of data therein. For example, this check might be used to ensure that date fields do not have a value of "John" or the like.

In one embodiment, the data type check counts the number of records in output files which have invalid data type (by field). The cumulative average in this case represents the average number of affected records. The cumulative average may be averaged over the day of the week and/or the number of elements in average (30 days, 60 days, 90 days, etc.).

A certain level of variance or deviation from the average is acceptable, and thereby creates a range of acceptable values. In one embodiment, the range is entered manually such as by a network operator; alternatively, the variance may be self-adjusting (discussed elsewhere herein). If the instance of affected records in the collected data is within the average given the percent variance for the number of affected records by delivery file for that period (e.g., day of the week), the data is deemed valid. If not, an error message is generated and the error optionally logged.

(iv) Mandatory Field Check—

A mandatory field check counts the number of records in output files which have the specific invalid data type of a null value in a required field. In one implementation, daily data is collected, which represents a daily count of the number of records in output files that contain a null value in a required field (by field). That is to say, if the field is marked as mandatory, a value must be contained therein. As discussed elsewhere herein, the data type and validity in the field may be checked separately.

The data is compared to a cumulative average number of affected records which may be averaged over the day of the week and/or the number of elements in average (30 days, 60 days, 90 days, etc.). The level or percent of permissible variance in the number of affected records given the calculated average for that day of the week may be determined by a network operator (or management computer program) as discussed above.

(v) Content Validity Check—

The content validity check is another delivery integrity check which may be implemented via the method of FIG. 3b. The content validity check is used to ensure that appropriate values are entered in the given fields. For example, if the valid values for Field Y are "1", "2", or "3" then "0" should not appear in Field Y.

The content validity check is a periodic (e.g., daily) count of the number of records in output files which have an invalid data value (by field). Data regarding the type of invalid data in the field may also be collected for providing error correction. In other words, if, when the field value is in error, the presented value is always a duplicate of the prior field information, an automated system may use this information to correct the data from being duplicated to the incorrect field.

The daily count of the number of records in output files which have an invalid data value for each field is compared to an average for each respective field (see e.g., step 344). The average may, in one embodiment, comprise a cumulative average of the number of affected records averaged over the day of the week and/or number of elements in the average. The daily count may vary from the cumulated average by a predetermined percent variance, so that the number of affected records for that day of the week, etc. must be within a range of the cumulative average to be considered valid data.

(vi) Data Consistency and Entity Relationship Check—

A data consistency and entity relationship check is another delivery integrity check that may be performed. The data consistency and entity relationship check may be utilized, for example, to ensure that all customers in a revenue extract are present in a demographic or psychographic extract. In one embodiment, the data consistency and entity relationship check is performed according to the exemplary method shown in FIG. 3c.

Figure 3C:
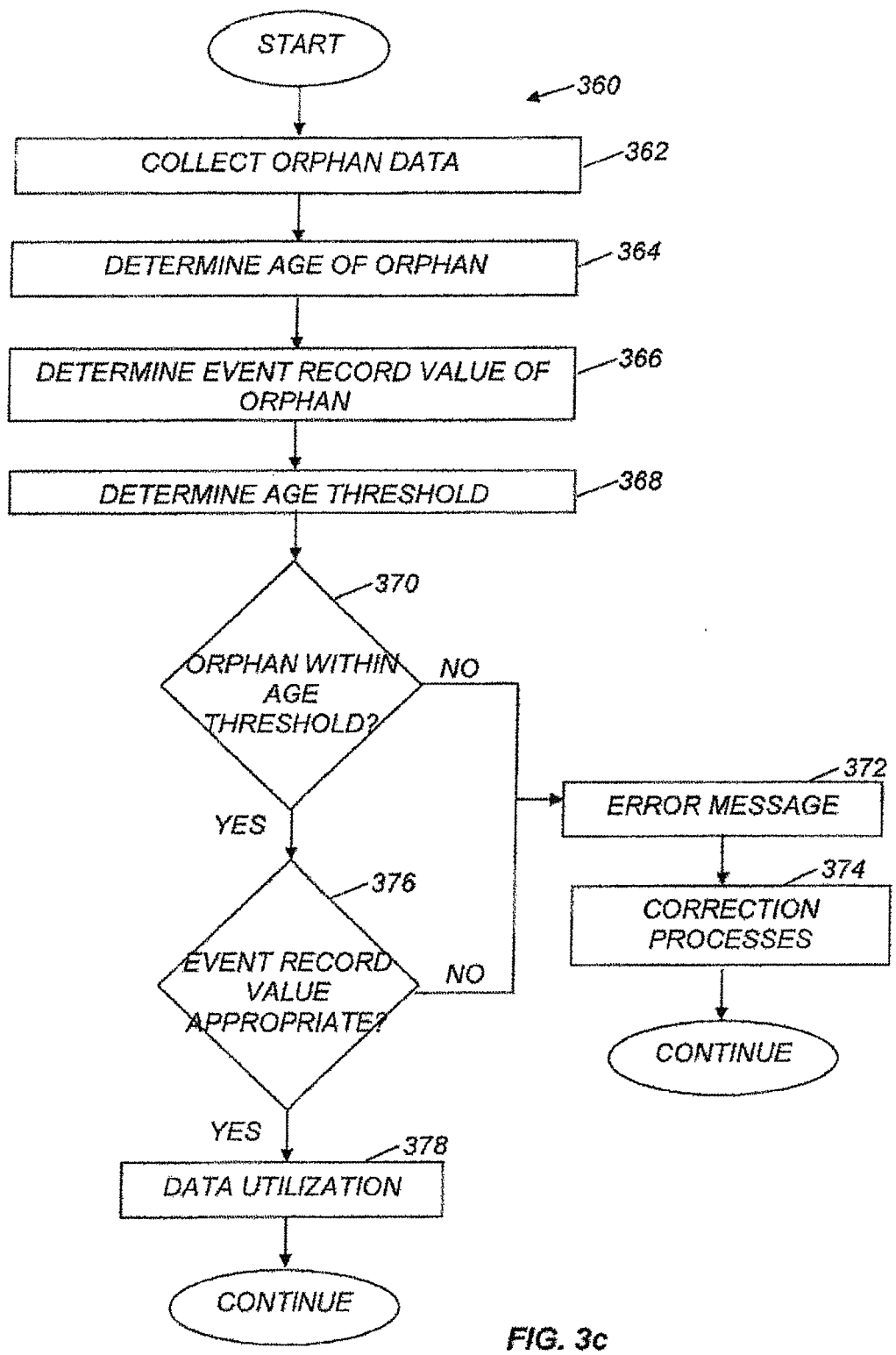
FIG. 3c is a logical flow diagram illustrating an exemplary embodiment of the method for validating data consistency according to the present invention.

As illustrated in FIG. 3c, at step 362 of the method, "orphan" data is collected. Orphan data comprises data which has values that are no longer used by any events. For example, a data record listing an advertisement zone which is no longer used in the system is considered orphan data at step 362. The age of the orphan is next determined (step 364). The age of the orphan may be determined by e.g., determining the number of days since the value was last used. Continuing the example from above, the age of the orphan may be determined by the last time the particular advertisement zone value appeared in an event record.

The event record value of the orphan is determined at step 366. In this step, information is gathered regarding the particular record to which the value corresponds. In the above example, the orphan advertisement zone value may appear in a record for advertisement zone.

An age threshold is determined at step 368. The age threshold represents a range of values for the age of the orphan which is deemed acceptable. In much the same manner as the variance or deviation discussed with respect to the embodiments above, the age threshold may be based on network operator evaluations for providing statistically significant results.

At step 370, it is determined whether the age of the orphan is within the given age threshold. If the orphan is not within the age threshold, an error message is presented to the network operator (step 372) and a correction process may begin (step 374). For example suppose the age threshold preset by the network operator is 0-120 days, so that no orphan data having an age of more than 120 days is deemed valid. If the age of the aforementioned advertisement zone value orphan is determined to be 145 days, the age of the orphan is outside the acceptable age range, an error message will be presented to the network operator, and correction process begun.

If the orphan is within the age threshold, it is next determined whether the value of the orphan is appropriate for the event record (step 376). If the value is not appropriate, an error message is sent (step 372) and/or the error logged, and correction processes may begin (step 374). If the value is appropriate, the data is deemed valid and utilized (step 378). Continuing the example from above, the orphan value in this case is an advertisement zone, found in an advertisement zone record. Hence, the value of the orphan is appropriate for the event record and the data may be utilized.

It will be appreciated that while many of the foregoing data and delivery integrity checks are described in terms of the absolute number, etc. of non-acceptable or erroneous events, data or files, one or more of these checks may be implemented in an inverse or percentage-wise fashion. For instance, instead of counting the number of records in output files which have an invalid data value (by field) in the aforementioned content validity check, the number of correct or acceptable records in output files may be counted. This may be taken as a percentage of all records counted for instance. Other such variations and permutations of the checks described herein will be recognized by those of ordinary skill given the present disclosure.

Error Correction and Learning—

Figure 4:
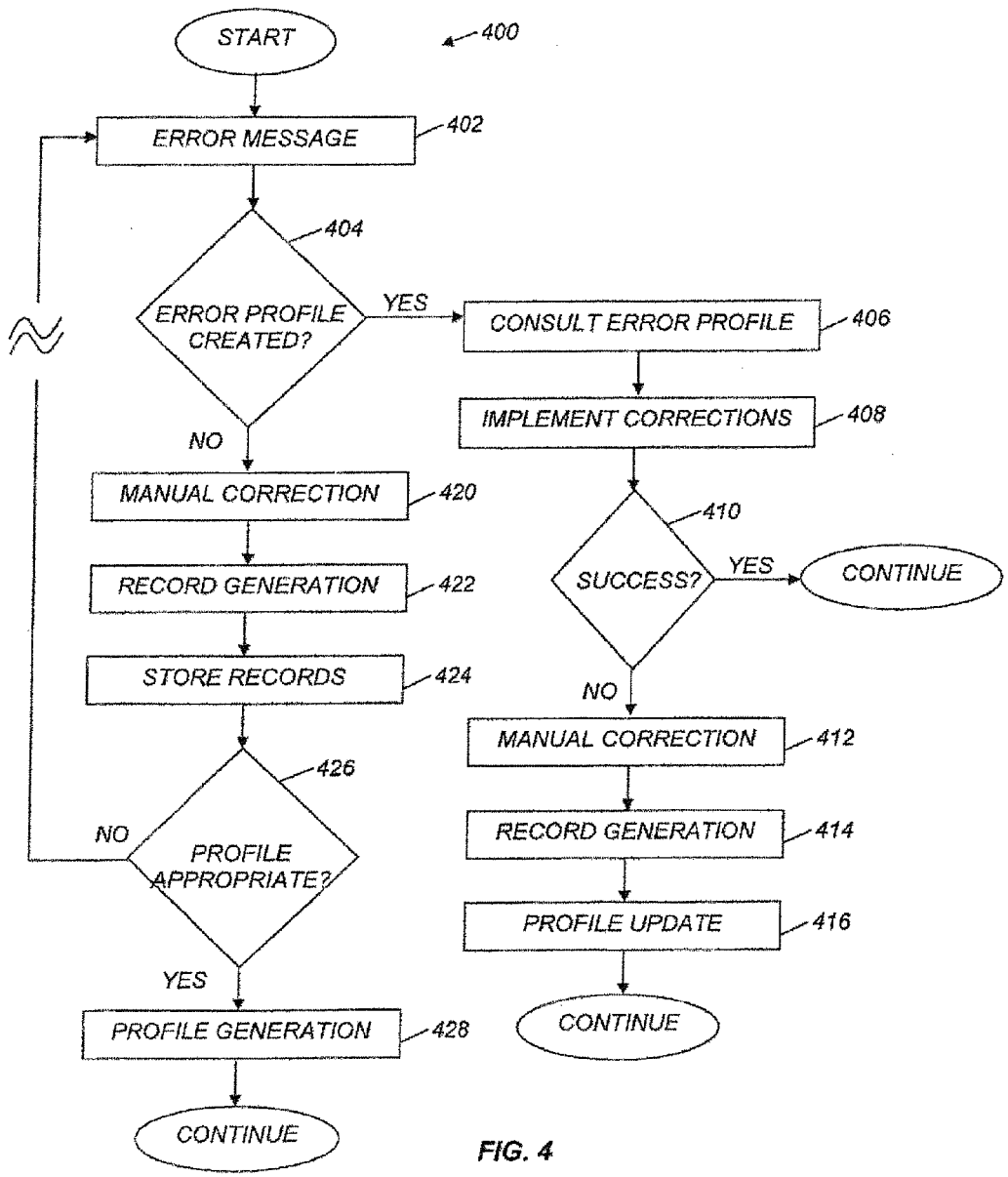
FIG. 4 is a logical flow diagram illustrating an exemplary embodiment of the method for error correction according to the present invention.

Referring now to FIG. 4, one exemplary embodiment of the process for error correction according to the invention is given. As shown, per step 402, an error message is received (or log file accessed). As discussed above, the error message/log identifies the data which is determined to be invalid given the data and delivery integrity checks.

At step 404, it is determined whether an error profile has been created for this type of error. In one embodiment, this is accomplished by evaluating the event record against a plurality of event records for which profiles have been created in a data store. Alternatively, the data may be evaluated by data type, error type, type device associated with the data, etc. as opposed to or in conjunction with and evaluation based on event record.

If an error profile exists, the profile is consulted (step 406), and appropriate corrections are implemented (step 408). The success of the error corrections is then tested at step 410. In one embodiment, the model may be tested by utilizing the appropriate regression model to determine if the data returned is within a prescribed criterion; e.g., an acceptable number of standard deviations. Utilized in this way, the success of the error correction will take into account movement of the model as a function of time, etc. If the automated correction is not successful, then, at step 412, the error is manually corrected by a network operator, or corrected using another process (e.g., a second correction routine). A record of the manual correction is generated at step 414, which is used to update the error correction profile at step 416, so that subsequent implementations of the error correction profile "learn" from the network operator's manual entry. That is to say, subsequent implementations of the error correction profile may be set to always use the specific correction which was performed manually by the network operator (or by the second process). Alternatively, the error correction profile may be set to continue to perform the correction it had previously performed unless the circumstances are similar to those under which the network operator/second process made the aforementioned specific correction.

If an error profile does not exist, at step 420, the error is manually corrected by a network operator (or another process). A template may be used for the creation of such profiles as well. A record is generated (step 422) and stored (step 424) regarding the correction.

At step 426, it is determined whether the records are appropriate for creating a profile. The determination may be based on the number and consistency of correction records per record type, field type, error type, etc. Hence if enough records have not been generated for the generation of an error correction profile to be appropriate, then the process repeats at step 402 where additional error messages are received.

If enough records have been generated for the generation of an error correction profile, a profile is created at step 428. For example, suppose the network operator reviews the correction records for a ZIP code field and determines that errors in this field are often identified due to the entry of four additional numbers to the standard ZIP code identifier (e.g., 92128-2554 in the field rather than simply 92128). The records may indicate that when the 9 digit type ZIP code is presented, the network operator manual correction is always to eliminate the last four digits. Hence, when a network operator determines that enough instances of this type of correction have been deployed, the network operator may establish the error correction profile that indicates that for this type of record and/or this type of error, the final four digits should be eliminated or truncated.

According to the aforementioned method 400, error correction profiles may be created and deployed thereby further automating the data validation, and correction process and eliminating a significant portion of user/operator intervention. As discussed above, the herein discussed data collection and validation entity 200 may learn from the manual corrections entered by the network operator.

Self-Adjusting Variance—

In another embodiment of the invention, the amounts by which received data is permitted to vary from an average for the data (e.g., level of variance) may be self-adjusting, and/or able to "learn" from received data and manual/automated corrections. This may be accomplished by e.g., the data collection and validation entity 200 having one or more computer programs running thereon configured to monitor the error correction instances, and profiles and rule sets which enable derivation of adjustments therefrom. For example, suppose the instance of error with respect to a certain data type increases sharply (e.g., rate of error change or "error velocity" change), yet the error correction profile and/or manual correction instances indicate that the data is still valid. In response, the data collection and validation entity 200 may determine that the level of variance or deviation should be adjusted, or that other action should be taken (e.g., analysis of why the data error rate of change is increasing).

In one embodiment, the validated data may be analyzed in a manner similar to Nielsen® audience measurement system analysis to determine viewership for a particular program, network, time of day, day of the week, etc. The data may also be analyzed for the purpose of providing targeted secondary content insertion opportunities. For example, if the collected data indicates that user or subscriber devices registered to the 92123 ZIP code often view particular programming, then the collection and validation entity 200 (or other entity receiving the validated data) may indicate to an entity providing advertising (or other secondary content) to the users in that ZIP code that targeted advertising may be provided to these devices during the particular programming.

Data Analysis—

While the aforementioned methods and systems are generally utilized for data collection and validation, it is appreciated that further data analysis may be performed with respect to the validated data.

In one embodiment, the validated data may be analyzed in a manner similar to Nielson analysis to determine viewership for a particular program, network, time of day, day of the week, etc. The data may also be analyzed for the purpose of providing targeted secondary content insertion opportunities. For example, if the collected data indicates that user or subscriber devices registered to the 92123 ZIP code often view particular programming, then the collection and validation entity 200 (or other entity receiving the validated data) may indicate to an entity providing advertising (or other secondary content) to the users in that ZIP code that targeted advertising may be provided to these devices during the particular programming.

As noted above, because the volume of data collected is so large, without the data integrity and delivery integrity checks described herein, the data is effectively "unaccredited" or unvalidated, and therefore worthless. Unvalidated data may not be relied upon by the programmer, marketer, MSO, etc., since its validity is at best questionable.

Once data is validated/accredited as discussed herein, the data may be used by others. An audit process may be performed periodically to ensure the validation/accreditation discussed herein provides accurate and representative results.

The validation techniques described herein may advantageously be performed by literally any entity, including e.g., the MSO, a third party such as a studio or advertiser, etc. In other words, the data validation methods and apparatus discussed herein may be utilized to transform (and audit) data collected by any entity.

The aforementioned systems and methods also may optionally be configured to "predict" tuning behavior for groups as well as individual users. In one embodiment, the collected data (including audience information) may be obtained directly from customer's premises equipment (i.e. set top boxes, cable modems etc.), for each individual box, or even on a per-user basis. This may be accomplished by e.g., tagging or marking the collected data with a descriptor indicating the device and/or user (as well as requiring a user login or other confirmation). The collected data is then analyzed with respect to the household, device, user, etc. and patterns may be observed. For example, it may be observed that a certain user may view content between only 6 pm and 9 pm, etc. In one exemplary embodiment, the methods and apparatus discussed in co-owned, co-pending U.S. patent application Ser. No. 12/414,576 filed on Mar. 30, 2009 and entitled "RECOMMENDATION ENGINE APPARATUS AND METHODS" may be utilized to analyze data and observe patterns in viewership. The observed patterns may then be used to predict tuning behavior. For example, given the observed pattern above, it may be predicted that the user will operate his device during 6 pm. These predictions may be utilized for bandwidth allocation, making content recommendations, targeted advertising, etc.

In a further embodiment, these methods and apparatus would be able to monitor multiple sources of content to which viewership behavior relates, and also maintain subscriber anonymity or privacy (i.e., no use of personally identifiable information). For example, the techniques for providing anonymity utilizing a cryptographic hash described in U.S. patent application Ser. No. 11/186,452 filed Jul. 20, 2005 and entitled "METHOD AND APPARATUS FOR BOUNDARY-BASED NETWORK OPERATION", which is incorporated herein by reference in its entirety, may be utilized in conjunction with the present invention.

Exemplary User Device—

Figure 5:
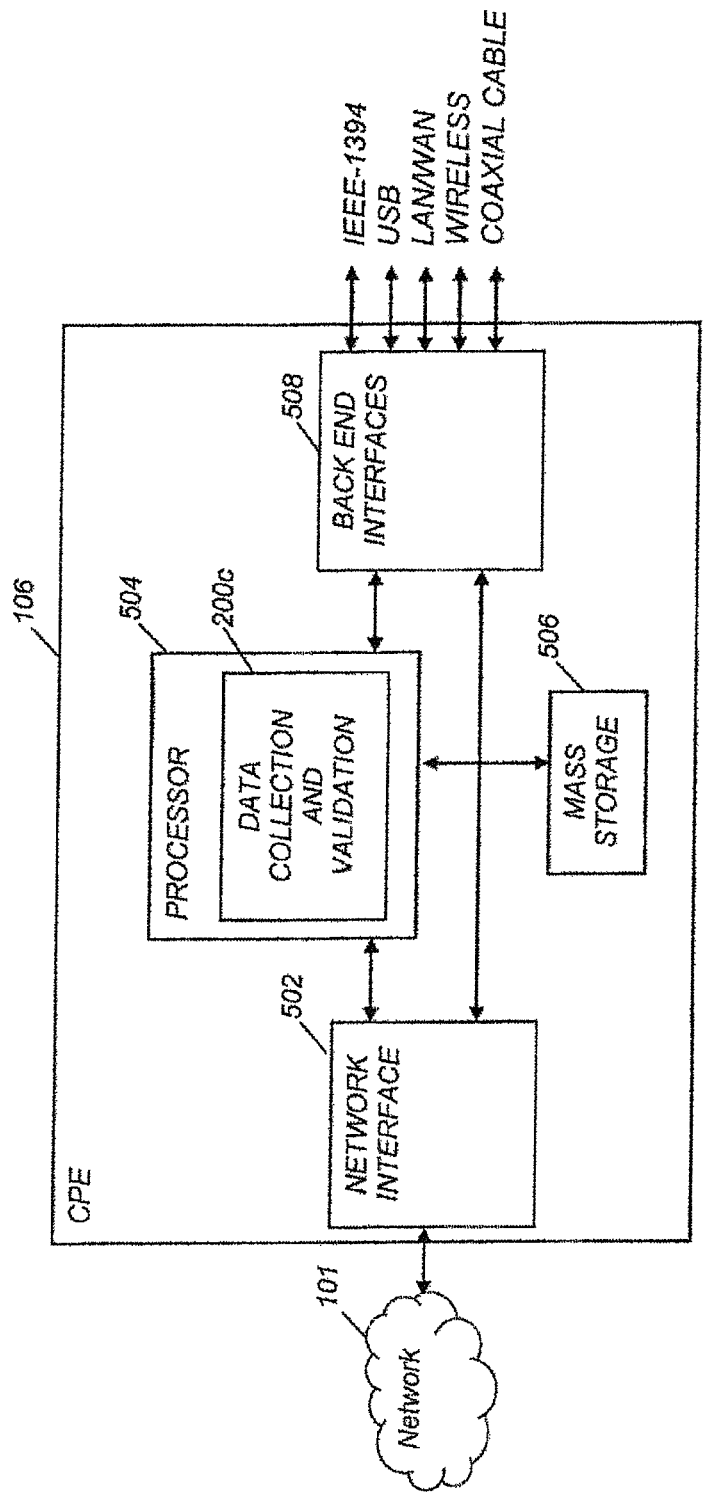
FIG. 5 is a block diagram illustrating an exemplary user device configured according to the present invention.

FIG. 5 illustrates an exemplary embodiment of a CPE 106 for use with the present invention. In one variant, this CPE comprises a premises receiver such as a digital settop box (DSTB) or gateway, PC, or the like; however, it will be appreciated that the user device may further comprise a PMD 107, smartphone, laptop computer, or other user-operated device.

It will further be appreciated that in MSO implementations where no CPE or client portion of the data collection software process (e.g., client application running on the CPE or PMD) is used, literally any type of device that is compatible with the bearer network may be used. However, in cases where a client process is desired (e.g., to obtain subscriber/use/CPE profile or operational data using a client portion of a distributed application, and send it back upstream to the network portion of the application), the following exemplary configuration may be used.

As shown in FIG. 5, the exemplary device 106 generally comprises a network interface 502 configured to interface with the network(s) 101 of FIGS. 1-1c, one or more digital processor(s) 504, storage device(s) 506, and a plurality of interfaces 508 (e.g., video/audio interfaces, IEEE-1394 "FireWire", wireless LAN/PAN/MAN) interfaces, USB, serial/parallel ports, HDMI, DisplayPort, etc.) for interface with other end-user apparatus such as televisions, personal electronics, computers, WiFi or other network hubs/routers, etc. In one embodiment, the device may comprise an OpenCable (OCAP)-compliant embedded system having an RF front end (including tuner and demodulator/decryptors) for interface with an HFC network. Other components which may be utilized within the device (deleted from FIG. 5 for simplicity) various processing layers (e.g., DOCSIS MAC or DAVIC OOB channel, MPEG, etc.) as well as media processors and other specialized SoC or ASIC devices. The CPE 106 may also comprise an integrated HD decoder, thereby relieving any connected monitors or other devices from the requirement of having such a decoder. These additional components and functionality are well known to those of ordinary skill in the cable and embedded system fields, and accordingly not described further herein.

The CPE 106 of FIG. 5 may also provided with an OCAP 1.0-compliant application and Java-based middleware which, inter alia, manages the operation of the device and applications running thereon (including the aforementioned client software process where used). It will be recognized by those of ordinary skill that myriad different device and software architectures may be used consistent with the tuning functions of the present invention, the device of FIG. 5 being merely exemplary. For example, different middlewares (e.g., MHP, ARIB, or ACAP) may be used in place of the OCAP middleware of the illustrated embodiment.

In another embodiment, the CPE 106 comprises a converged premises device, such as for example that described in co-owned U.S. patent application Ser. No. 11/378,129 filed Mar. 16, 2006 and entitled "METHODS AND APPARATUS FOR CENTRALIZED CONTENT AND DATA DELIVERY", which is patented as U.S. Pat. No. 8,347,341 on Jan. 1, 2013, incorporated herein by reference in its entirety.

As previously noted, the CPE 106 of FIG. 5 may further comprise a client portion 200c of a distributed application (see e.g., FIGS. 2c and 2d) configured to collect, validate, and/or transmit data, in the form of e.g., a software application running on the CPE 106. This software application may be configured to perform any number of functions, including without limitation: (i) data collection regarding user or device-specific activities such as tuning or activity logs, power on/off times/duration, PPV/VOD requests, frequency of use of other ancillary functions associated with the CPE, DVR or monitor operation and use (such as via communications from a connected DVR or monitor device), etc., (ii) data validation, including performance of one or more of the aforementioned data and/or delivery integrity checks (or portions of the processing supporting them), (iii) data transmission, (iv) forming a cryptographic hash of one or more CPE-specific variables in order to maintain the anonymity of the CPE/subscriber with respect to transmitted data, as described elsewhere herein, (v) identifying and communicating data validity errors as determined by the one or more data and/or delivery integrity checks, (vi) error logging and correction functions, and so forth.

As previously noted, any data of interest may be directly transmitted to the upstream software portion(s) 200a, 200b, 200d (e.g., via an OOB message or other communication), or stored or logged in a file and sent when requested by the system (or according to other models, such as being sent periodically, on CPE startup, upon network polling, etc.). Moreover, the network system can also receive and log events during the normal course of operations (in conjunction with any data obtained and forwarded by the CPE software client or other processes running thereon), such as e.g., upstream OD content requests, PPV requests, LSCP/"trick mode" commands, EPG update requests, etc.

Server—

Figure 6:
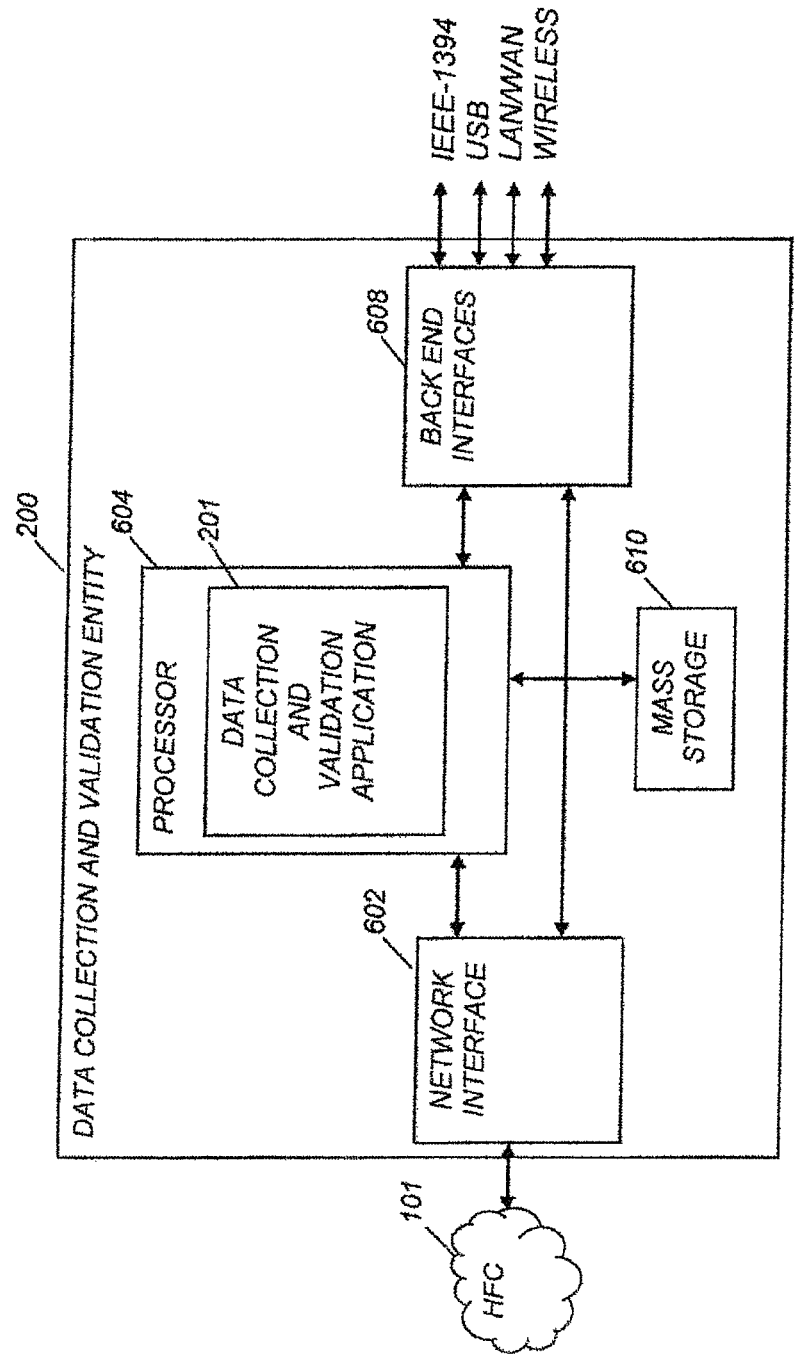
FIG. 6 is a block diagram illustrating an exemplary data collection and validation entity according to the present invention.

Referring now to FIG. 6, an exemplary configuration data collection and validation entity 200 is described in detail. As noted above, in certain embodiments, the functions of the collection and validation entity 200 may be distributed across a plurality of devices. Hence, the illustrated collection and validation entity 200 may be disposed at the headend 150, a local service node, and/or at a third party 202.

The data collection and validation entity 200 generally comprises a network interface 602 for communication with the network 101, a processor subsystem 604 and associated storage 606, as well as additional interfaces 608 for communication with other entities.

The processor subsystem 604 is configured to run a data collection and validation application 201 thereon. The application may comprise e.g., a distributed application at a headend or third party entity (200a, 200b, 200d), or yet other configurations of software known in the arts. The data collection and validation application 201, when executed, enables the data collection and validation entity 200 to inter alia request and/or receive data from the user devices, validate the data, implement one or more automated error correction mechanisms, analyze data, and/or ensure subscriber anonymity.

It is appreciated that the data collection and validation entity 200 may comprise additional components (not shown) and functionality well known to those of ordinary skill in the network and embedded system fields, and accordingly not described further herein. For example, management or supervisory processes, and/or business rules software (described in greater detail below) may be run on the data collection and validation entity 200. Fail-over protection, additional physical or network security mechanisms, etc. may also be implemented.

Anonymity—

As noted above, certain data (including collected data, etc.) may be particular to, or uniquely associated with, a particular subscriber, user, or user device. Accordingly, such data may be anonymized by inter alfa, the use of a cryptographic hash to protect the privacy of the identified subscriber, user, and/or device. In one embodiment, the techniques for providing anonymity utilizing a cryptographic hash described in U.S. patent application Ser. No. 11/186,452 filed Jul. 20, 2005 and entitled "METHOD AND APPARATUS FOR BOUNDARY-BASED NETWORK OPERATION", which is incorporated herein by reference in its entirety, may be utilized in conjunction with the present invention. As disclosed therein, the identity of a subscriber device or subscriber is anonymized by using a cryptographic hash coupled with an optional "opaque" variable which carries information relating to the subscriber device of the hash with which it is associated. The hash and opaque variable frustrate de-encryption or reverse-engineering of the individual subscriber's identity or specific location. Alternative methods of providing anonymization may also be utilized consistent with the present invention.

While complete anonymization (i.e., there is no way of tracing or identifying the source) is generally not applicable to information which must be used to uniquely identify an individual and/or device, partial anonymization may be readily used with the present invention. For example, it may be desirable to perform a one-way hash of a user's IP address or MAC address so that someone surreptitiously obtaining the information cannot determine the source data (actual address), but the hash algorithm produces a known deterministic result with the same "seed", and hence the hash output can be used to uniquely identify a given user/device, such as by matching that hashed output with known outputs from the same algorithm corresponding to existing subscribers/devices. This hashing is to be distinguished from encryption, wherein the original source data (address) can in fact be recovered and read when the encrypted data is decrypted (such as via a public/private encryption key pair).

Business/Operational Rules Engine—

In another aspect of the invention, the aforementioned data collection and validation entity 200 (e.g., including one or more computer programs, whether distributed or not, for providing the functionality of the data collection and validation entity 200) optionally includes an entity having an operations and/or business rules "engine". This engine comprises, in an exemplary embodiment, a series of software routines that are adapted to control the collection, validation, analysis and transmission of data. These rules may also be fully integrated within the aforementioned one or more computer programs and be controlled via the entity on which the program is run. In effect, the rules engine comprises a supervisory entity which monitors and selectively controls the collection, validation, analysis, and/or transmission functions at a higher level, so as to implement desired operational or business rules of the MSO or other parties of interest.

The rules engine can be considered an overlay of sorts to the algorithms of the previously described computer applications. For example, the exemplary computer application may invoke certain operational protocols or decision processes based on data received (e.g., historical activity or user data, subscriber preferences, etc.), as well as network operational or historical data, demographic data, geographic data, etc. However, these processes may not always be compatible with higher-level business or operational goals, such as maximizing profit on a network-wide basis, or system reliability and/or flexibility. Moreover, the computer application being "supervised" may be operating on a per-CPE, per-household, or per-request basis (i.e., the collected data may be collected for individual CPE effectively in isolation, and analysis may be performed without considering larger patterns or decisions being made in the service group or network as a whole).

Hence, when imposed, the business/operational rules of the engine can be used to dynamically (or manually) control the operation of the aforementioned processes in conjunction with the collection, validation, analysis, and/or transmission functions previously described.

For example, one rule implemented by the rules engine may comprise selectively collecting and validating, transmitting, or analyzing data regarding viewership only from certain users; e.g., those who have agreed to have their viewership data collected (whether for consideration or otherwise). Accordingly, only those users who affirmatively "opt in" will have data collected about their household or devices. In another variant, certain features may only be provided to users who agree to have data collected.

As another alternative, collected and verified data may only be provided to particular parties (e.g., third parties) who meet certain reliability and/or quality standards, or who have been pre-qualified by the MSO (irrespective of whether they would add revenue or profit for the MSO), such as for sufficient security for the data, sufficient processing capability, which provide certain time or quality guarantees, etc., so that the MSO may ensure that the data will be protected and used efficiently and properly.

As noted above, data must be validated or accredited in order to be deemed useable (i.e., in order to be relied upon). Although this validation may occur manually, the volume of collected data in the present invention makes such manual validation impossible. Manual collection methods may only be utilized on comparatively small samples of data, and are often error-ridden, whereas, the present invention enables validation of large volumes of data across the entire MSO footprint automatically.

Many other approaches and combinations of various operational and business paradigms are envisaged consistent with the invention, as will be recognized by those of ordinary skill when provided this disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method of providing data collection in a network, said method comprising:
    collecting a plurality of data relating to interaction of a plurality of users with content or with an apparatus controlling said content;
    deriving an expected value for said plurality of data;
    based at least in part on said expected value, configuring a range of acceptable values for said plurality of data;
    comparing said plurality of data to said range of acceptable values; and
    transmitting said plurality of data to at least one entity for analysis of said plurality of data when said plurality of data is determined to be within said range.

2. The method of claim 1, wherein said act of deriving an expected value for said plurality of data comprises deriving a value for an average number of individual instances of said plurality of data expected to be collected over a given period of time.

3. The method of claim 1, wherein said act of deriving an expected value for said plurality of data comprises deriving a value for an average number of user devices within a given geographic area from which said plurality of data is expected to be collected.

4. The method of claim 1, wherein said act of deriving an expected value for said plurality of data comprises deriving a value for an average number of user devices expected to be tuned to each channel over a given period of time.

5. The method of claim 1, wherein said act of deriving an expected value for said plurality of data comprises deriving a value for an average number of user devices expected to be tuned to each network over a given period of time.

6. The method of claim 1, wherein said act of deriving an expected value for said plurality of data comprises deriving a value for an average number of programs expected to be viewed, requested, provided, and/or made available on a given channel.

7. The method of claim 1, wherein said network comprises a content delivery network, said apparatus controlling said content comprises a content server, said data comprises a total number of tuning events received at said content server, and said act of deriving an expected value for said plurality of data comprises deriving a value for an average number of tuning events expected to be received at said content server.

8. In a content delivery network comprising a plurality of users receiving content at a respective plurality of user devices via one or more platforms, a method of collecting data comprising:
    collecting data relating to an interaction of said plurality of users with said content received at said respective plurality of user devices via said one or more platforms;
    comparing values of individual ones of a plurality of data fields in said data to one or more acceptance criteria for each of said individual ones of said plurality of data fields; and
    transmitting said data to at least one entity for analyzing said data when said one or more acceptance criteria are met.

9. The method of claim 8, further comprising deriving said one or more acceptance criteria.

10. The method of claim 9, wherein said act of deriving comprises generating a value for an average number of advertisements delivered to a portion of said plurality of users within a given advertisement zone via said one or more platforms.

11. The method of claim 9, wherein said act of deriving comprises generating a value for an average number of advertisements received at said plurality of user devices via said one or more platforms.

12. The method of claim 9, wherein said act of deriving comprises generating a value for an average number of each type of a plurality of tune-out events occurring at individual ones of said plurality of user devices.

13. The method of claim 9, wherein said act of deriving comprises generating a value for an average number of each type of a plurality of channel changing events occurring at individual ones of said plurality of user devices.

14. The method of claim 9, wherein said act of deriving comprises generating a value for an average number of each of: tune-in, tune-out, and tune-away events occurring at individual ones of said plurality of user devices.

15. Non-transitory computer readable apparatus comprising a medium configured to store a computer program thereon, said computer program comprising a plurality of instructions which are configured to, when executed:
    collect a plurality of data records, individual ones of said plurality of said data records each comprising a plurality of data fields having values contained therein, said values each configured to be validated;
    compare said values of said plurality of data fields for each of said collected plurality of data to one or more accepted values specific to individual ones of said plurality of data fields;
    transmit said plurality of data to at least one entity for analysis when said values of each of said plurality of data fields are within a predetermined range of said one or more accepted values therefor; and
    implement a substantially automated error correction process of individual ones of said data fields which are determined to have values that are not within said predetermined range of said one or more accepted values therefor.

16. The apparatus of claim 15, wherein at least one of said values of said plurality of data fields comprises a value indicative of an amount of data provided to a particular client device over a given time window.

17. The apparatus of claim 15, wherein said predetermined range of said one or more accepted values comprises a range of content types of which said values are expected to be.

18. The apparatus of claim 15, wherein at least one of said values of said plurality of data fields comprises a value indicative of a number of records expected to be received at a particular client device over a given time window.

19. The apparatus of claim 15, wherein at least one of said values of said plurality of data fields comprises a value indicative of a number of records which contain a null value in a required field and said predetermined range of said one or more accepted values therefor is zero.

20. The apparatus of claim 15, wherein at least one of said values of said plurality of data fields comprises a value indicative of a number of records which contain a value that is not present in any other of said plurality of collected data records.

21. Apparatus configured to provide data collection in a network, said apparatus comprising:
   a data processing apparatus; and
   computerized logic in data communication with said data processing apparatus, said logic configured to:
      collect a plurality of data relating to interaction of a plurality of users with content or with an apparatus configured to control said content;
      derive an expected value for said plurality of data;
      based at least in part on said expected value, configure a range of acceptable values for said plurality of data;
      compare said plurality of data to said range of acceptable values; and
      based at least on said comparison:
         transmit said plurality of data to at least one entity for analysis of said plurality of data when said plurality of data is determined to be within said range; or
         when said plurality of data is determined not to be within said range:
            generate at least one error message;
            implement an error correction process to correct said plurality of data; and
            transmit corrected data to said at least one entity for analysis.

22. The apparatus of claim 21, wherein said error correction process comprises a test thereof, when said error correction process fails said test, said computerized logic being further configured to:
   accept manual correction to said plurality of data; and
   update an error correction profile to improve said error correction process based on said manual correction.

23. The apparatus of claim 22, wherein said range of acceptable values is based at least in part on said updated error correction profile.

24. The apparatus of claim 21, wherein said range of acceptable values is based at least in part on a regression analysis.

25. The apparatus of claim 24, wherein a regression period of said regression analysis is set based on a statistical significance of said regression analysis.

* * * * *